(12) United States Patent
Aoki et al.

(10) Patent No.: US 8,876,412 B2
(45) Date of Patent: Nov. 4, 2014

(54) OPTICAL CONNECTOR AND ELECTRONIC EQUIPMENT USING THE SAME

(75) Inventors: Tsuyoshi Aoki, Kawasaki (JP);
Shigenori Aoki, Kawasaki (JP);
Hidenobu Muranaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 248 days.

(21) Appl. No.: 13/561,341

(22) Filed: Jul. 30, 2012

(65) Prior Publication Data
US 2013/0084045 A1 Apr. 4, 2013

(30) Foreign Application Priority Data

Sep. 29, 2011 (JP) .................................. 2011-213986
Dec. 8, 2011 (JP) .................................. 2011-269364

(51) Int. Cl.
*G02B 6/36* (2006.01)
*G02B 6/38* (2006.01)
*G02B 6/35* (2006.01)
*G02B 6/43* (2006.01)

(52) U.S. Cl.
CPC ............ *G02B 6/3885* (2013.01); *G02B 6/3873* (2013.01); *G02B 6/3506* (2013.01); *G02B 6/3552* (2013.01); *G02B 6/3576* (2013.01); *G02B 6/3859* (2013.01); *G02B 6/43* (2013.01)
USPC .................................. 385/92; 385/89; 385/139

(58) Field of Classification Search
CPC ... G02B 6/3576; G02B 6/3873; G02B 6/3885
USPC .............................................. 385/88–94, 139
See application file for complete search history.

(56) References Cited

U.S. PATENT DOCUMENTS

| | | | | |
|---|---|---|---|---|
| 4,458,984 A | * | 7/1984 | Roberts et al. | 385/70 |
| 4,807,957 A | * | 2/1989 | de Jong et al. | 385/64 |
| 5,080,461 A | * | 1/1992 | Pimpinella | 385/65 |
| 5,606,635 A | * | 2/1997 | Haake | 385/53 |
| 6,124,663 A | * | 9/2000 | Haake et al. | 310/307 |
| 6,853,765 B1 | * | 2/2005 | Cochran | 385/23 |

FOREIGN PATENT DOCUMENTS

| | | |
|---|---|---|
| JP | 2001-228359 A1 | 8/2001 |
| JP | 2002-31745 A1 | 1/2002 |

* cited by examiner

*Primary Examiner* — Daniel Petkovsek
(74) *Attorney, Agent, or Firm* — Kratz, Quintos & Hanson, LLP

(57) ABSTRACT

An optical connector includes a fiber holder to hold optical fibers; a housing to accommodate the optical fibers and the fiber holder; and a thermally driven actuator to displace at least a part of the fiber holder upon application of heat from a first position at which the fiber holder is retracted inside the housing to a second position that allows the optical fibers to be optically coupled to a counterpart connector.

14 Claims, 21 Drawing Sheets

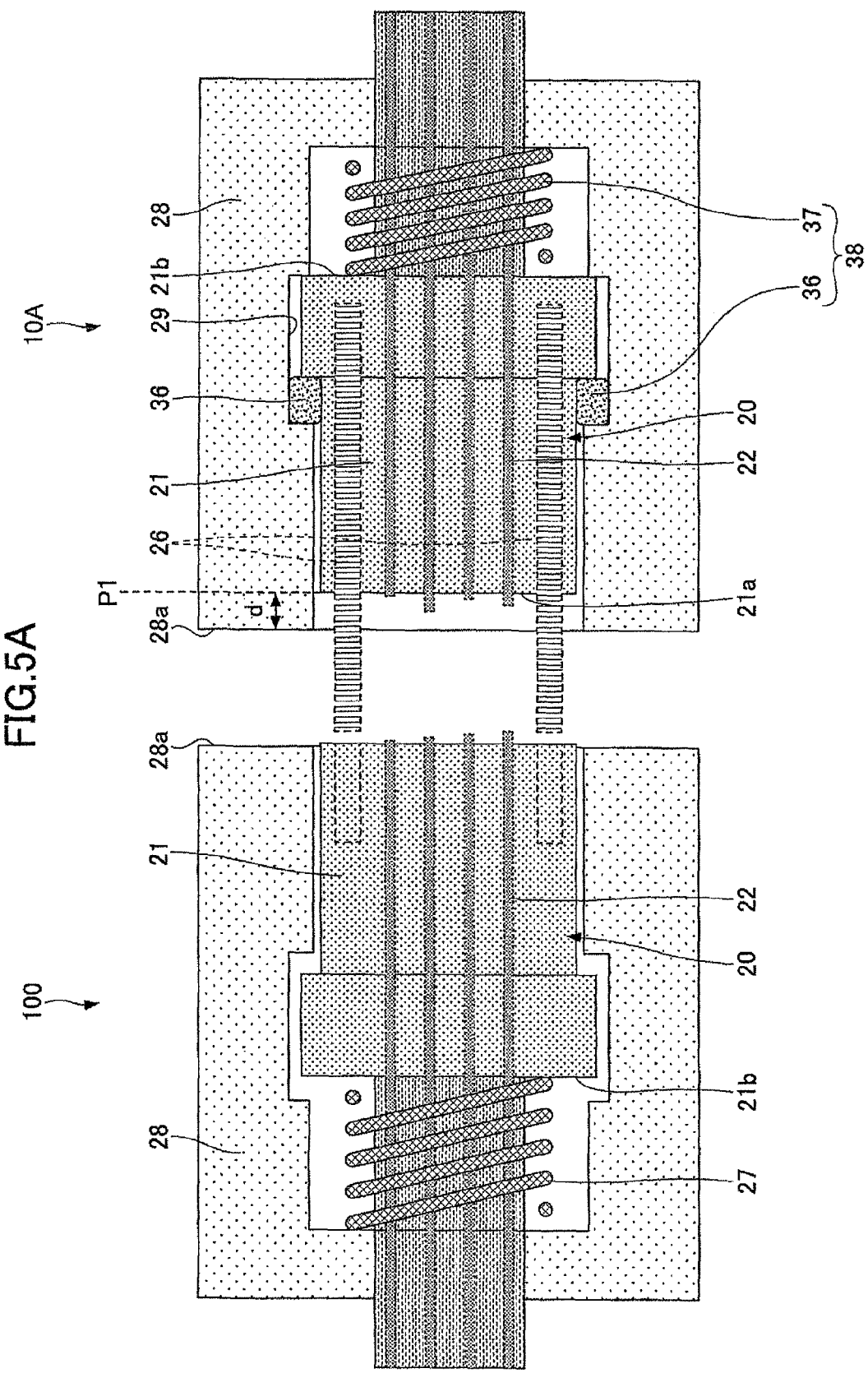

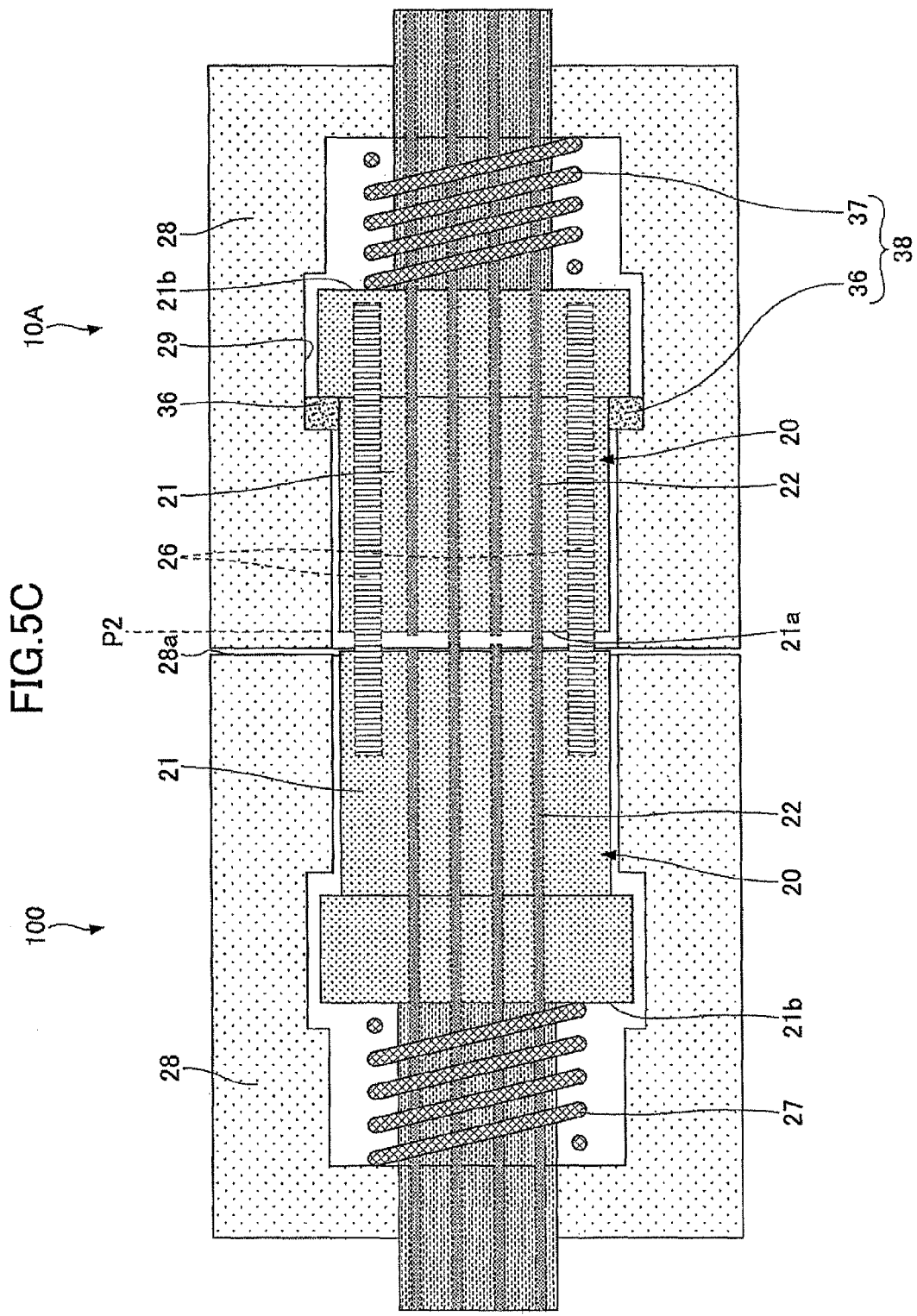

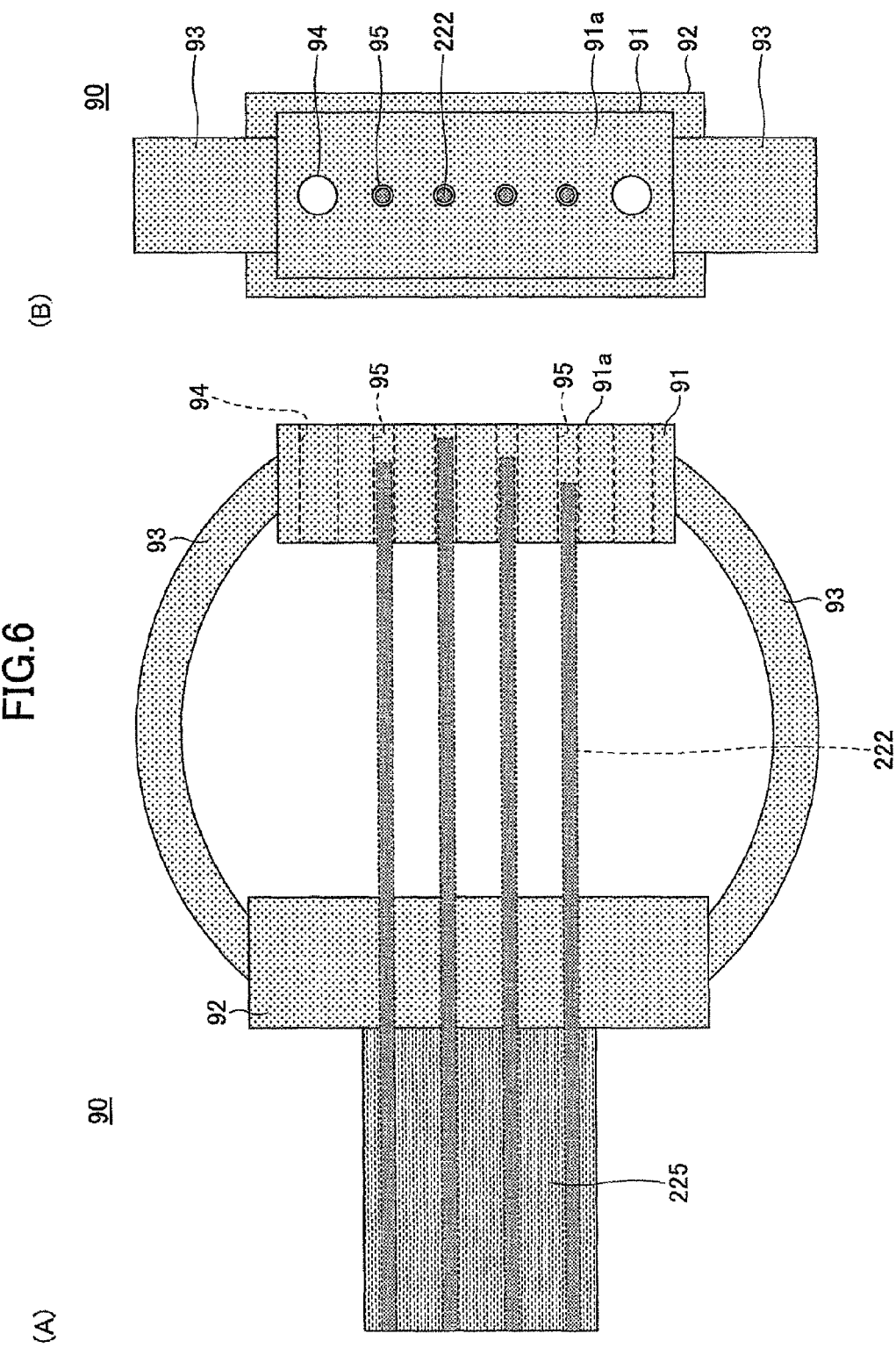

FIG.9
(A)
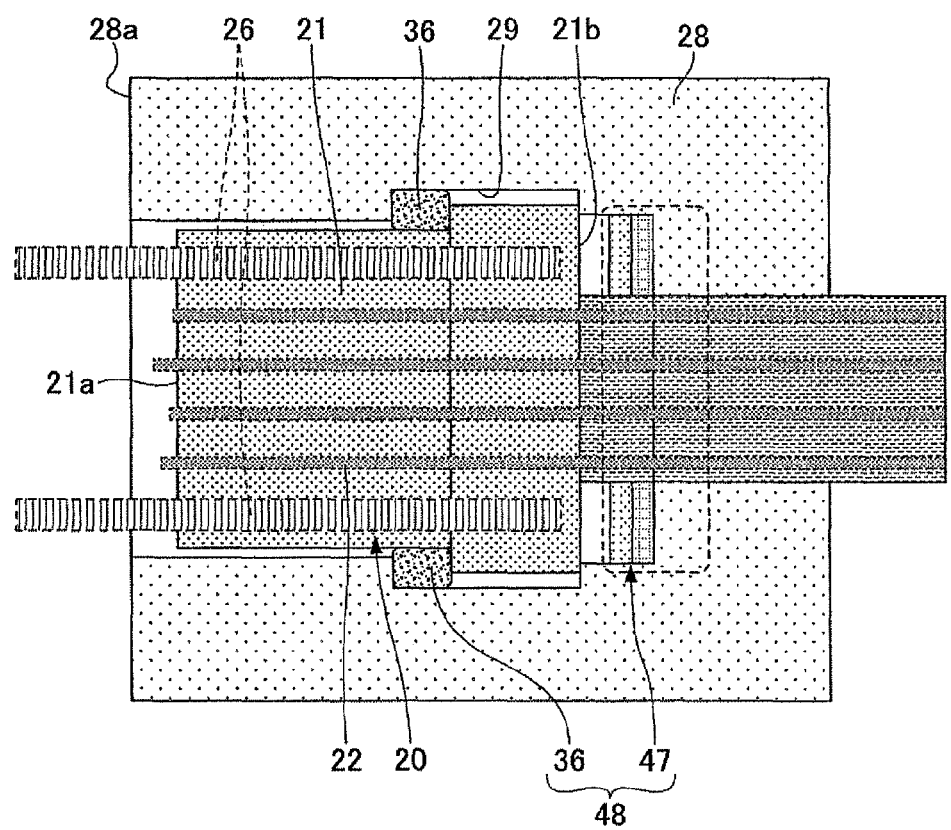
(B)
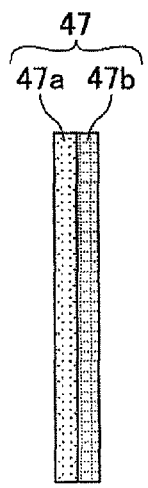
(C)
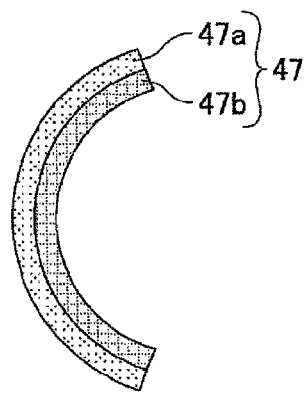

OPTICAL CONNECTOR AND ELECTRONIC EQUIPMENT USING THE SAME

CROSS REFERENCE TO RELATED APPLICATIONS

This application is based upon and claims the benefit of priorities of the prior Japanese Patent Application No. 2011-213986 filed on Sep. 29, 2011 and the prior Japanese Patent Application No. 2011-269364 filed on Dec. 8, 2011, the entire contents of which are incorporated herein by references.

FIELD

The embodiments discussed herein relate to an optical connector and electronic equipment using thereof.

BACKGROUND

In recent years, in the technological fields of super computers or servers, a signal transmission rate between LSIs or between an LSI and a memory has been steadily accelerated. Due to the increase of the signal transmission rate, it is hard for the conventional electronic wiring systems to deal with problems such as degradation of signal waveforms and increase in power consumption. Currently, optical interconnections have been attracting attention as a new connection scheme to solve the problems. Optical interconnections are able to transmit a large number of signals at low power consumption using a broadband optical interconnect transmission path.

Inter-board connection using an optical interconnection between LSIs is realized by providing optical transmission paths such as optical fibers or optical waveguides between devices mounted on boards. Such devices include optical transmitter devices for converting electric signals to optical signals and optical receiver devices for converting optical signals to electric signals. To extend the hardware system or carry out maintenance for a supercomputer or server system with optical interconnects, an LSI-mounted board is removed from and inserted into the system. At this time, optical transmission paths are also disconnected from and connected to the system together with electric connectors adapted for power feeding or low-rate signal transmission. For this reason, in the field of optical interconnection, development of detachable fiber optic connectors are expected as well as development of optical devices and optical transmission lines.

The number of the optical transmission lines used as optical interconnections in a server system is enormous. Many inventions have been made for multi-fiber optical connectors for connecting multi-channel optical transmission paths mainly in the technological field of optical communications. In particular, MT-ferrule based optical connectors employing a mechanical splice technique are widely used at present. In the MT-ferrule based connectors, optical fibers are aligned at a predetermined pitch inside a ferrule. The optical fibers of two facing connectors are correctly positioned with respect to each other using a guide pin provided in one of the connectors and a guide hole provided in the other. Then the optical fibers of one connector are collectively brought into contact with the optical fibers of the counterpart connector when the two connectors are mated to each other.

However, constructing optical interconnections using MT-ferrule-based connectors adapted for optical communications purposes will lead to increase of the cost. This is because the end faces of optical fibers are polished at high precision after the optical fibers are incorporated into the ferrule to adjust the amount of projections of the fibers. To reduce the cost, no-polish connectors are preferred.

A method called high-speed MT connector assembly is known to implement a low-cost no-polish fiber connector. With this method, a jig with a slight recess is pushed against the front face of an MT ferrule when assembling optical fibers in the MT ferrule. Using this jig, the optical fibers can be incorporated in the MT ferrule with the ends projecting from the front face of the ferrule. However, it is difficult to precisely control the amount of projection of the optical fibers due to variation in the lengths of the optical fibers. In addition, some of the optical fibers do not project from the ferrule; rather, they are retracted inside the ferrule. If two optical connectors are mated to each other under the condition where fluctuations exist in the amount of fiber projection, an impulsive force is concentrated on the channel with a large amount of fiber projection. In this case, optical fibers are damaged and long-term reliability is not achieved.

To reduce the influence of the variation in the fiber projection, it is proposed to press a dummy ferrule against the end faces of the optical fibers to align the end position of the optical fibers (see, Patent Document 1 listed below). A method of applying an optically transparent resin to the front face of the ferrule is also proposed (see, Patent Document 2 listed below), where the index of refraction of the optically transparent resin is close to that of the optical fiber cores.

Optical connectors at low cost and high connection reliability are desired.

Patent Document 1: Japanese Laid-open Patent Publication No. 2001-228359
Patent Document 2: Japanese Laid-open Patent Publication No. 2002-31745

SUMMARY

According to one aspect of the present disclosure, an optical connector includes a fiber holder to hold optical fibers; a housing to accommodate the optical fibers and the fiber holder; and a thermally driven actuator to displace at least a part of the fiber holder upon application of heat from a first position at which the fiber holder is retracted inside the housing to a second position that allows the optical fibers to be optically coupled to a counterpart connector.

The object and advantages of the invention will be realized and attained by means of the elements and combinations particularly pointed out in the claims.

It is to be understood that both the foregoing general description and the following detailed description are exemplary and explanatory and are not restrictive to the invention as claimed.

BRIEF DESCRIPTION OF DRAWINGS

FIG. 5A is a diagram illustrating a disconnected state of the optical connector of FIG. 4;

FIG. 5C is a diagram illustrating an optically connected state of the optical connector of FIG. 4;

FIG. 6 is a diagram illustrating a flexible ferrule used in an embodiment.

FIG. 9 is a diagram illustrating a modification of the optical connector of FIG. 4;

DESCRIPTION OF EMBODIMENTS

The embodiments of the present invention are described below with reference to the figures. In the embodiments, a thermally driven actuator is used to optically connect fiber optic connectors to each other.

Figure 1:
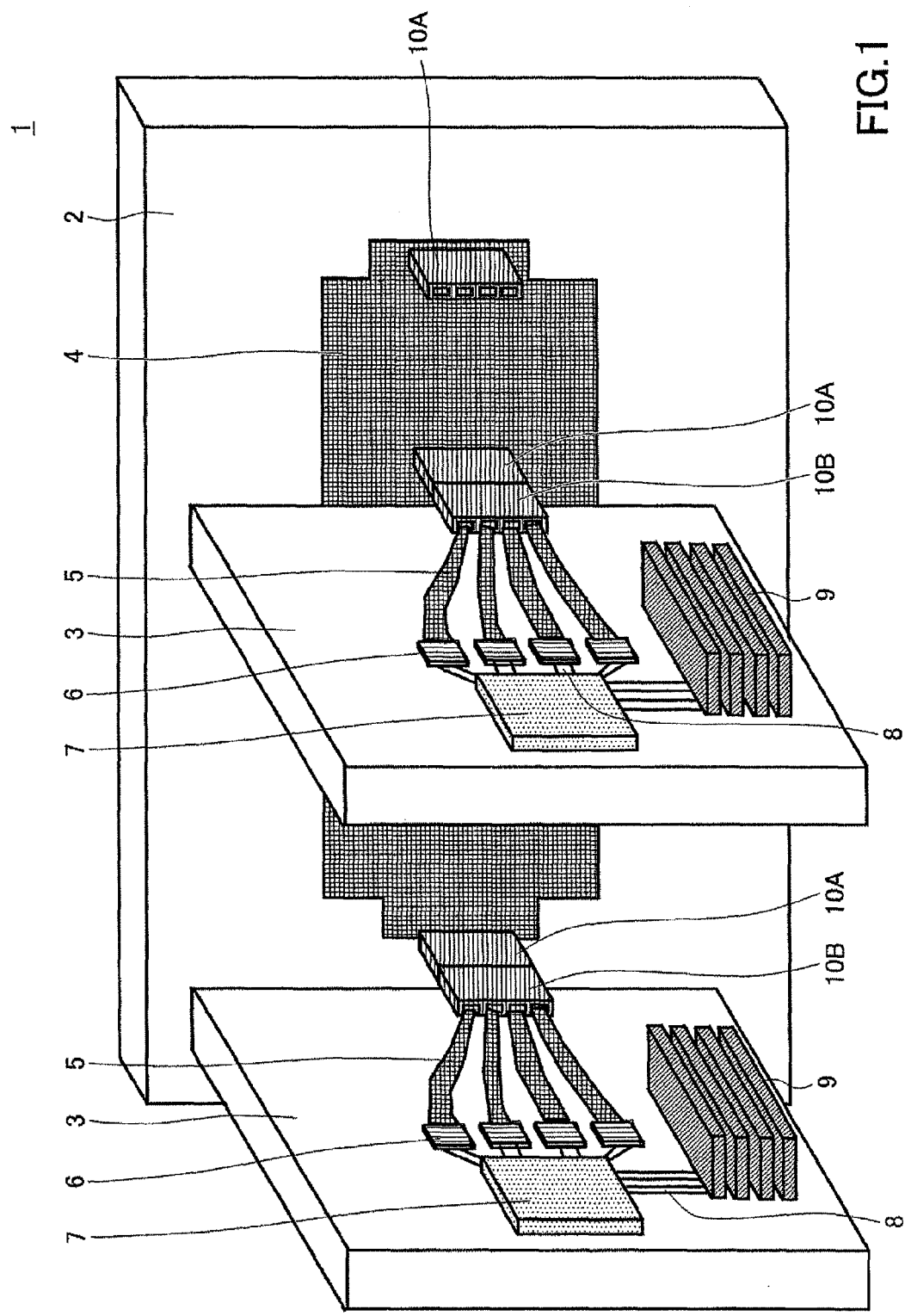
FIG. 1 is a diagram illustrating a configuration example of electronic equipment to which an optical connector of the present embodiment is applied.

FIG. 1 is an exemplary diagram of electronic equipment 1 to which a fiber optic connector 10 (hereinafter referred to as "optical connector 10") of an embodiment is applied. The electronic equipment 1 includes a backplane board 2 and plug-in boards such as CPU boards 3 plugged in the backplane board 2. An optical transmission path 4 is formed on the backplane board 2, and the CPU boards 3 are optically connected to each other through optical connectors 10A and 10B. Electronic components such as a LSI 7, a memory 9, etc., and an optical-to-electric (O/E) and electric-to-optical (E/O) conversion module 6 are mounted on each of the CPU boards 3. An electrical signal generated by the electronic components such as the LSI 7, the memory 9, etc., is converted into an optical signal at the E/O converter of the conversion module 6 and transmitted to other CPU boards 3 through optical transmission paths 4 and 5 and the optical connectors 10A and 10B. The optical transmission path 4 and the optical transmission paths 5 are, for example, optical fibers (optical fiber sheets).

A backplane side optical connector 10A is connected to the optical transmission path 4. A board side optical connector 10B is provided at an edge of the CPU board 3. When a CPU board 3 is plugged in the backplane board 2, the optical connectors 10A and 10B are mated and optically connected to each other. For convenience of illustration, only two of the CPU boards 3 are illustrated in FIG. 1, but many boards including CPU boards and accessory boards are connected to each other via optical interconnects in the electronic equipment 1. Accordingly, the optical connectors 10A and 10B are low-cost no-polish optical connectors.

Figure 2:
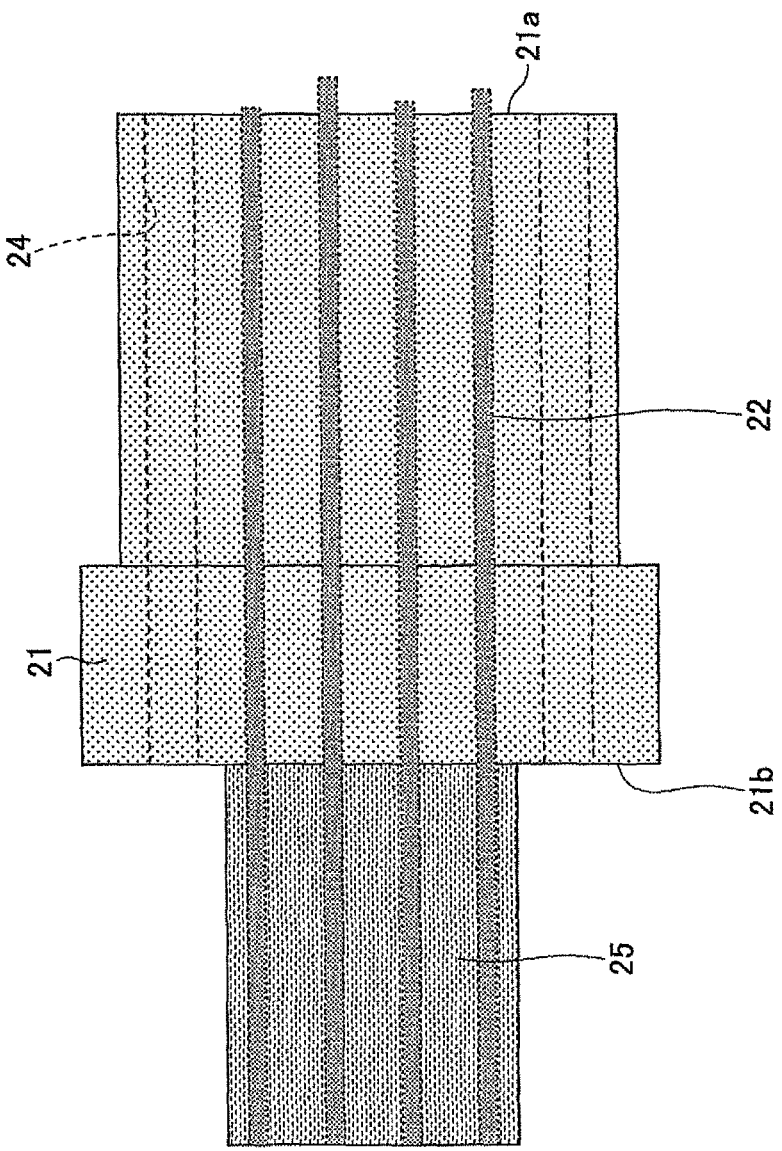
FIG. 2 is a schematic diagram of a no-polish multi-fiber ferrule used in an optical connector.

FIG. 2 illustrates a no-polish multi-fiber ferrule 20 holding optical fibers inside the optical connector 10. The no-polish multi-fiber ferrule 20 includes optical fibers 22 and a ferrule 21 holding the optical fibers 22. In this embodiment, a 4-fiber ferrule 20 is illustrated. The end portion of a tape coating 25 is removed from the optical fibers 22 and each of the optical fibers 22 is inserted into one of fiber insertion holes 23. The optical fibers 22 are incorporated in the ferrule 21 with the leading ends projecting about 20 μm from the front face 21a of the ferrule 21. At this time, cutting lengths vary among the optical fibers 22 and channels of the optical fibers 22 with different lengths of projections are formed as illustrated in FIG. 2. A guide-pin hole 24 is formed in the ferrule 21 to receive a guide pin of a counterpart optical connector to correctly position the optical fibers 22 with respect to the counterpart connector. The no-polish multi-fiber ferrule 20 is typically accommodated in a connector housing and used as an optical connector 10 as will be described below with reference to FIG. 4.

Figure 3:
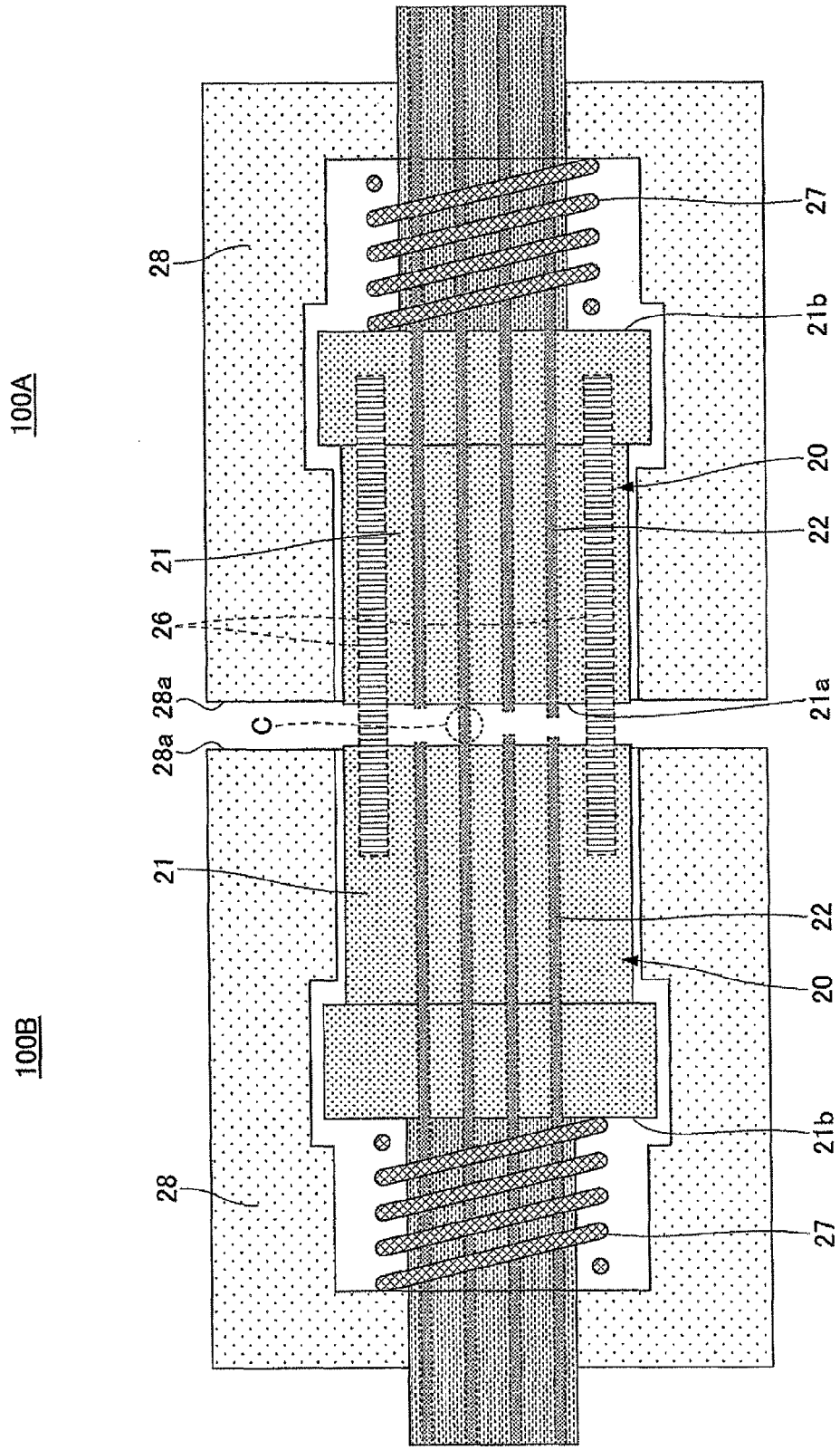
FIG. 3 is a diagram illustrating a problem arising in typical no-polish optical connectors when they are mated to each other.

FIG. 3 illustrates optical connection between no-polish optical connectors 100A and 100B, which optical connectors are conceived during a process of creating configurations of the present embodiments. No-polish multi-fiber ferrules 20 are accommodated in connector housings 28 of the optical connectors 100A and 100B provided on the backplane side and the plug-in board side, respectively. Prior to achieving optical connection between the optical connectors 100A and 100B, the front face 21a of the ferrule 21 aligns with the connecting face 28a of the connector housing 28. A rear end face 21b of the ferrule 21 is in contact with a spring 27.

Positioning accuracy of the two ferrules 21 is determined by guide pins 26. A compressive force is generated by the springs 27 to push the ferrules 21 toward the optically connected position. With this arrangement, when the optical fibers 22 of the backplane-side optical connector 100A and the optical fibers 22 of the board side optical connector 100B are brought into contact, a pair of optical fibers having the longest projections first contact each other to define a channel, as indicated by the circle C. Impulsive damage such as breakage of the fibers is likely to occur in the optical fiber 22 with the longest projections, which will adversely affect the long-term reliability of the product. In view of this, the inventors have conceived to use a thermally driven actuator to achieve appropriate optical connection between no-polish optical connectors.

Figure 4:
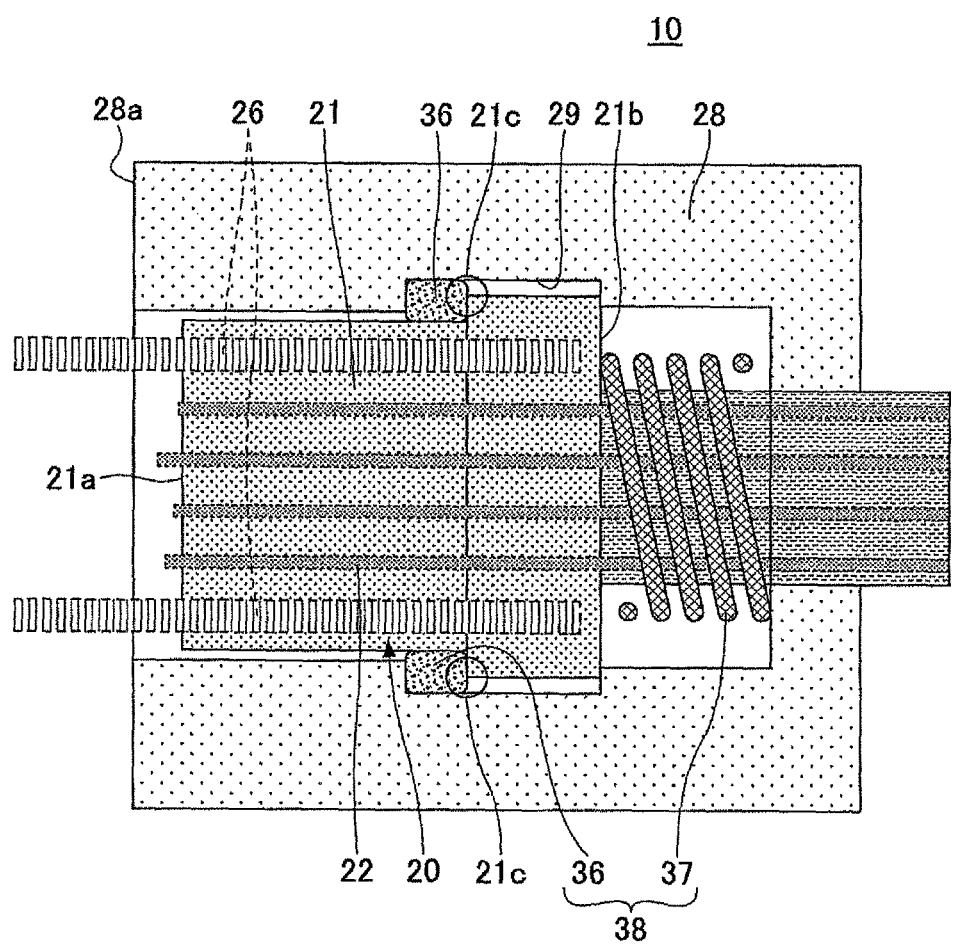
FIG. 4 is a schematic block diagram illustrating an optical connector of an embodiment using a thermally driven actuator.

FIG. 4 is a schematic block diagram of the optical connector 10 of an embodiment. The optical connector 10 includes optical fibers 22, a ferrule 21 for holding the optical fibers 22, a connector housing 28 for accommodating the optical fibers 22 and the ferrule 21, and a thermally driven actuator 38. The thermally driven actuator 38 is adapted to displace the ferrule 21 from a non-coupling position (first position) to an optically connected position (second position) upon application of heat. In this example, the thermally driven actuator 38 includes a shape memory alloy spring 37 and an elastic body 36.

Some of the optical fibers 22 are projecting from the front face 21a of the ferrule 21 due to variation in cutting length of the fibers. It is ideally desired that the end faces of all the optical fibers 22 align with the front face 21a of the ferrule 21; however, the length of the fibers varies as long as low-cost no-polish fibers 22 are used. It is preferred for the optical fibers 22 to slightly project from the ferrule 21 rather than be retracted inside the ferrule 21 because foreign particles are likely to get into the fiber insertion holes when the optical fibers 22 are retracted. Besides, if two optical fibers 22 come into contact with each other inside the ferrule 21, the connected fibers 22 are likely to be affected by air bubbles or condensation, and long-term reliability is degraded.

When the optical connector 10 is in the disconnected state, the ferrule 21 is positioned slightly retreating from the connecting face 28a of the connector housing 28. A rear end surface 21b of the ferrule 21 is in contact with the shape memory alloy spring 37 within the connector housing 28. The shape memory alloy is, for example, a titanium-nickel (TiNi) or any suitable alloy. A recess 29 is formed in the inner wall of the connector housing 28, and an elastic body 36 is placed in the recess 29. The elastic body 36 is, for example, a neoprene rubber. The shape memory alloy spring 37 pushes the ferrule 21 toward the connecting face 28a of the connector housing 28 when heat is applied. The elastic body 36 defines a final position of the front face 21a of the ferrule 21 and it pushes back the ferrule 21 to the original position (i.e., the retracted position) when heat supply to the shape memory alloy spring 37 has ceased. In FIG. 4, the elastic body 36 is inserted between a shoulder 21c of the ferrule 21 near the rear part thereof and the inner wall of the connector housing 28.

Figure 5B:
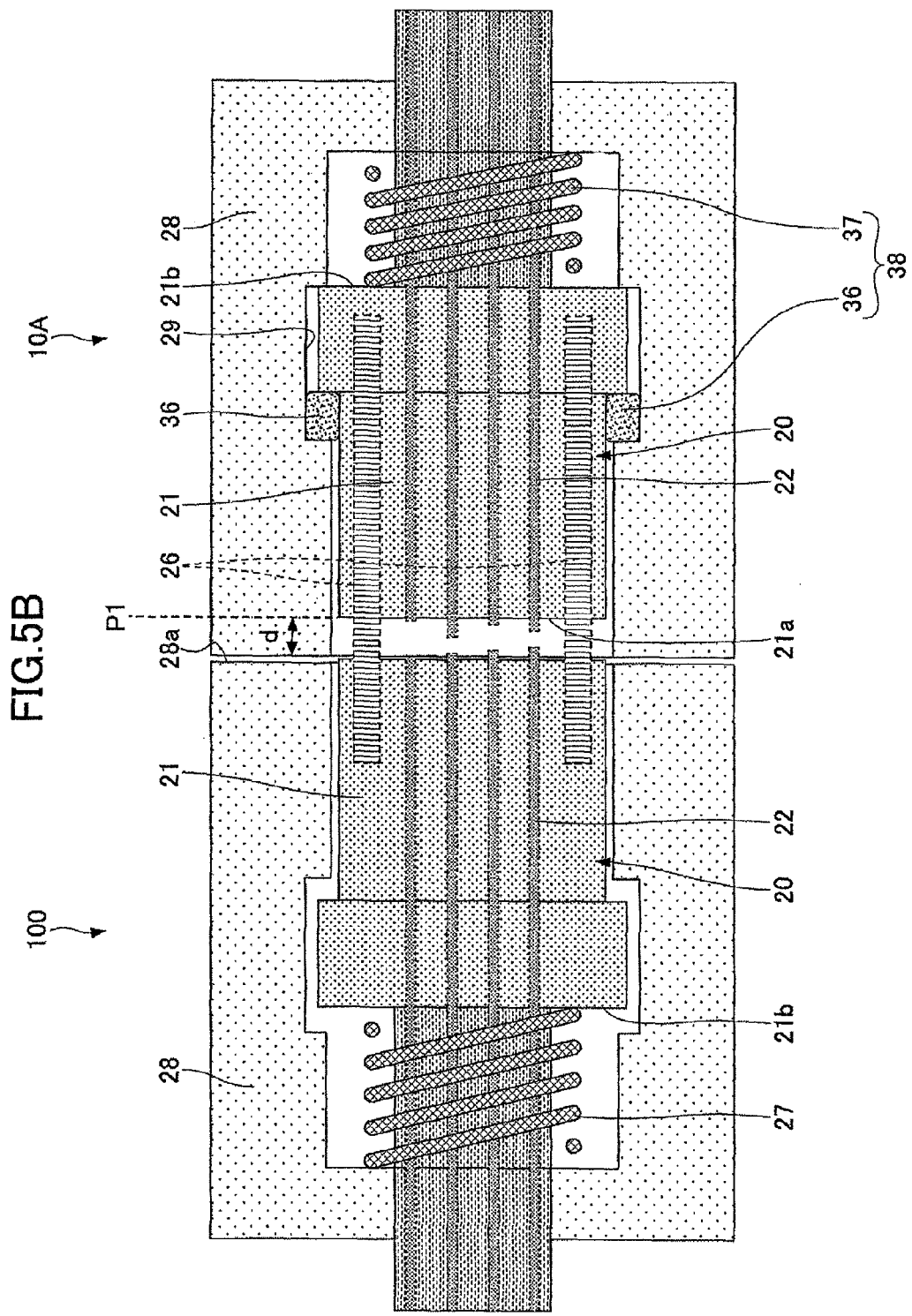
FIG. 5B is a diagram illustrating a semi-connected state of the optical connector of FIG. 4.

FIG. 5A through FIG. 5C illustrate how the optical connector 10 of FIG. 4 is optically connected to a counterpart connector. The optical connector 10 of FIG. 4 is applied to, for example, the backplane side optical connector 10A. The counterpart connector 100 may be the board side connector 100A illustrated in FIG. 3. The embodiment is not limited to this configuration. The optical connector 10 of FIG. 4 may be applied to the board side optical connector 10B, or alternatively, the optical connector 10 illustrated in FIG. 4 is applicable to both connector 10A and connector 100.

First, in the disconnected state illustrated in FIG. 5A, the thermally driven actuator 38 (mainly, the shape memory alloy spring 37) of the optical connector 10A is not receiving heat. The front face 21a of the ferrule 21 and the ends of the optical fibers 22 are positioned at P1, retreating inside from the connecting face 28a of the connector housing 28. The position P1 is referred to as a non-coupling position. As long as the front face 21a of the ferrule 21 is positioned at P1, the optical connector 10A is not optically coupled to the connector 100 even if the optical connector 10A is mechanically brought into contact with the board side connector 100. The retracting amount "d" from the connecting face 28a to the non-coupling position P1 is, for example, about 100 μm.

Then, the plug-in-board 3 (see FIG. 1) is plugged into the backplane board 2, the connector housing 28 of the board side optical connector 100 and the housing 28 of the backplane side optical connector 10A come into contact with each other, as illustrated in FIG. 5B. In this state, only the connector housings 28 are connected to each other, and the ferrule 21 is still retreating, staying at the non-coupling position P1. In other words, a gap exists between the ferrule 21 of the backplane side optical connector 10A and the ferrule 21 of the board side optical connector 100. This state is called a semi-connected state.

Then, as illustrated in FIG. 5C, upon application of heat to the optical connector 10A, the temperature of the shape memory alloy spring 37 of the thermally driven actuator 38 starts rising, and the connector state transitions from the semi-connected state to the optically connected state. The shape memory alloy starts elongating and the spring constant is increasing. Under the compressive force of the shape memory alloy spring 37, the ferrule 21 moves ahead from the retracted position P1 until the front face 21a reaches position P2, while deforming the elastic body 36. At position P2, the optical fibers 22 of the optical connector 10A are optically connected to the optical fibers 22 of the counterpart (board side) connector 100. Since the forward movement of the ferrule 21 is graduate, driven by heat, and because the connecting position of the optical fibers 22 is well controlled by the elastic body 36, breakage of or damage on the optical fibers 22 due to connecting impact can be prevented. The no-polish optical fibers 22 have variation in length, and accordingly, some of the optical fibers 22 might remain physically unconnected. However, the variation in the lengths of the optical fibers 22 is within a range that allows optical coupling, and accordingly, optical loss can be prevented even through a slight position gap exists along the connecting direction. When application of heat ceases, the elastic body 36 pushes the no-polish multi-fiber ferrule 20 back to position P1 in the semi-connected state of FIG. 5B.

FIG. 6 is an exemplary diagram of an elastically deformable ferrule 90, which can be used in place of the MT ferrule 21. The ferrule 90 has a front part 91 that has a front face 91a, a rear part 92 provided on the rear side near a coated tape 225, and flexible arms 93 connecting the front part 91 and the rear part 92. Guide-pin holes 94 and fiber guide holes 95 are formed in the front part 91. In this example, the front part 91, the rear part 92 and the arms 93 are integrally formed by injection molding.

The front part 91 and the rear part 92 hold and guide no-polish optical fibers 222. A part of the optical fibers 222 or the tape fiber bunched by the coated tape 225 is fixed by an adhesive inside the rear part 92. On the other hand, the tips of the optical fibers 222 are movable inside the fiber guide holes 95. When a force is applied to the ferrule 90 in a direction of insertion of the optical fibers 222, the arms 93 warp and the distance between the front part 91 and the rear part 92 becomes short. At this time, the optical fibers 222 elastically bend or buckle in the space between the front part 91 and the rear part 92.

As mentioned above, the lengths of the no-polish fibers vary after the cutting process. Accordingly, the optical fibers 222 inserted in the ferrule 90 are held in the fiber guide holes 95 such that the leading ends of the fibers 222 do not align with each other. As the arms 93 of the ferrule 90 elastically deform during connection with a counterpart connector, the leading ends of the optical fibers 222 move toward the front face 91a of the front part 91. The longest optical fiber 222 encounters first the corresponding optical fiber of the counterpart connector (e.g., a board side optical connector). Under further application of a pressure force, the longest optical fiber bends or buckles in the space between the front part 91 and the rear part 92. Thus, all the channels (the optical fibers 222) can be optically connected to the counterpart optical fibers. This behavior is explained with reference to FIG. 7A through FIG. 7C.

Figure 7A:
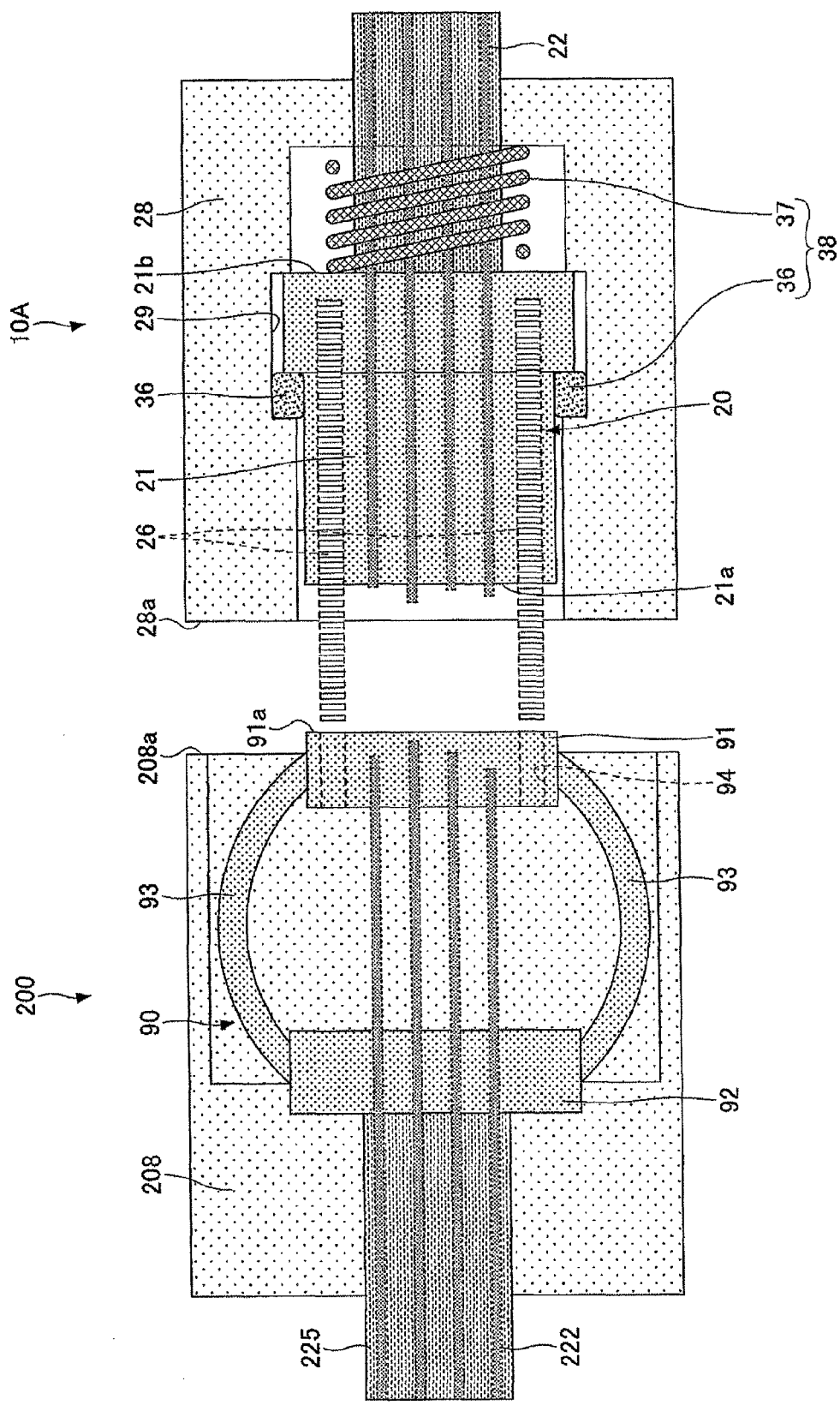
FIG. 7A is a diagram illustrating a disconnected state of the optical connector of the embodiment when the ferrule of FIG. 6 is used in a counterpart connector.
Figure 7B:
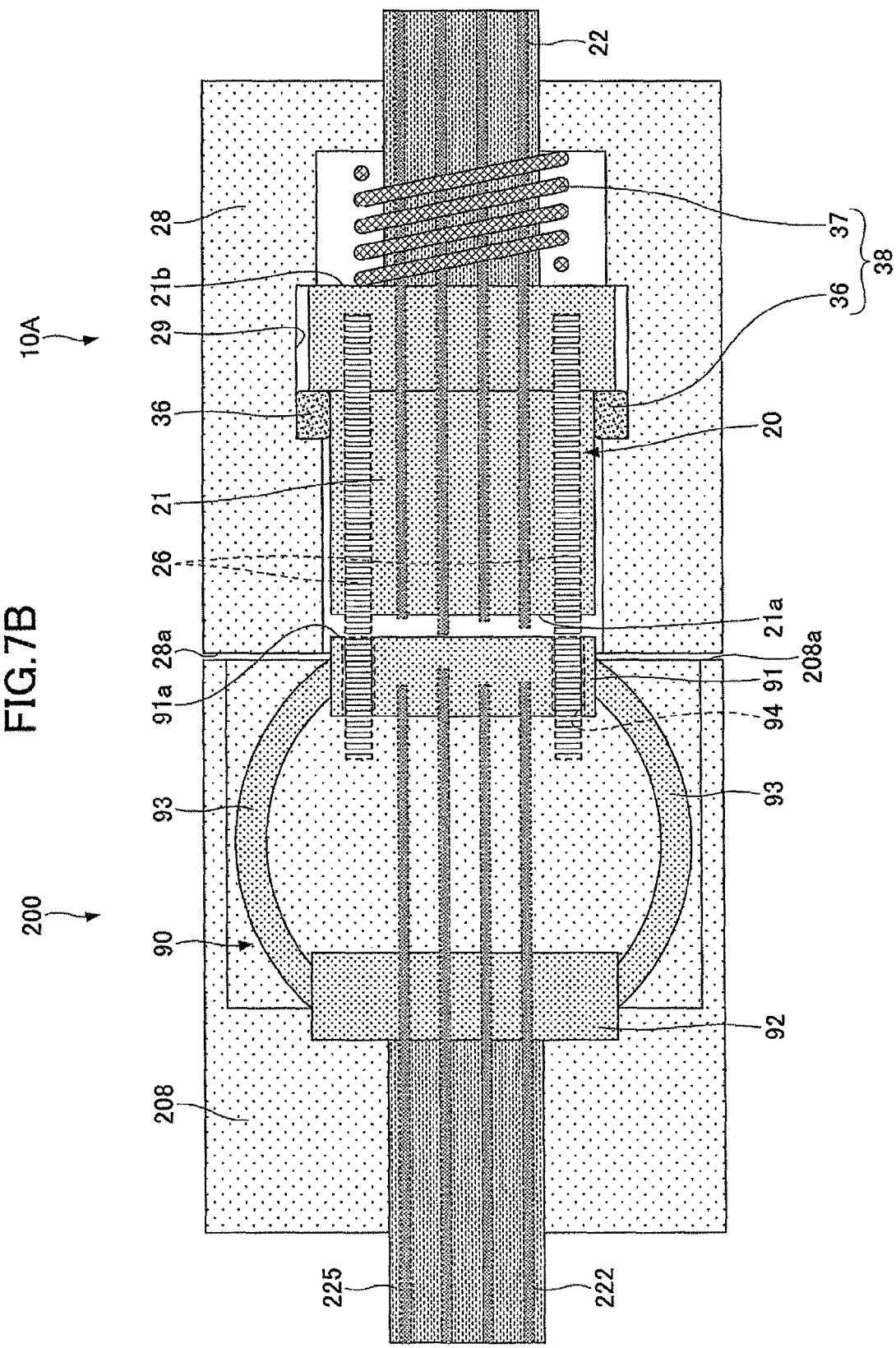
FIG. 7B is a diagram illustrating a semi-connected state of the optical connector of the embodiment when the ferrule of FIG. 6 is used in a counterpart connector.
Figure 7C:
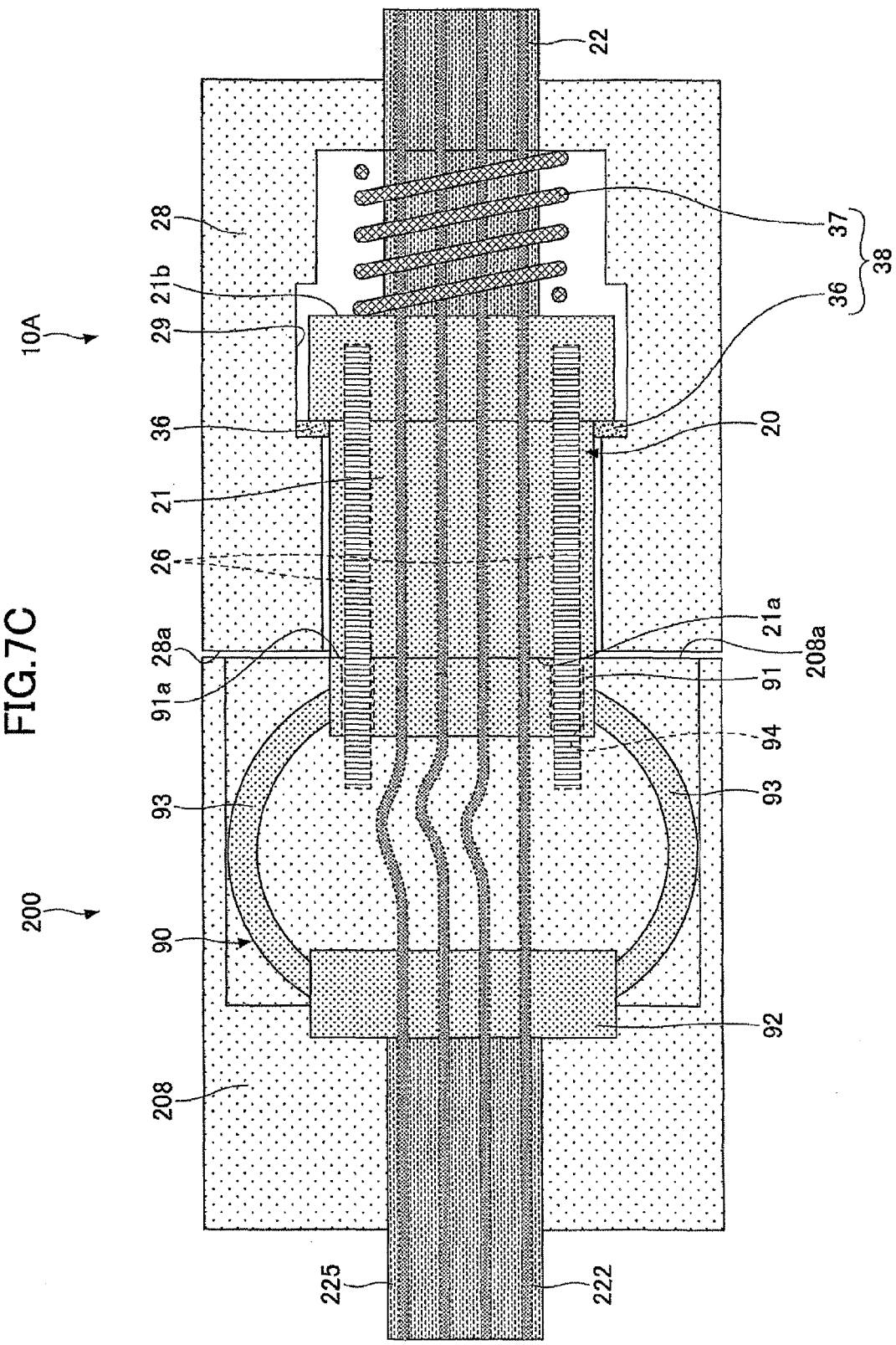
FIG. 7C is a diagram illustrating an optically connected state of the optical connector of the embodiment when the ferrule of FIG. 6 is used in a counterpart connector.

FIG. 7A, FIG. 7B and FIG. 7C illustrate a disconnected state, a semi-connected state and an optically connected state, respectively, between the optical connector 10A and the optical connector 200. In FIG. 7A through FIG. 7C, the ferrule 90 of FIG. 6 is applied to the board side optical connector 200, and the optical connector 10A with the thermally driven actuator 38 of FIG. 4 is used as the backplane-side connector.

In the disconnected state of FIG. 7A, the backplane-side optical connector 10A and the board side optical connector 200 are separated from each other. The front face 91a of the front part 91 of the ferrule 90 is projecting from the connecting face 208a of the housing 208 of the board side connector 200. The optical fibers 222 are retreating inside the front part 91.

In the semi-connected state of FIG. 7B, guide pins 26 of the backplane-side optical connector 10A are inserted into guide-pin holes 94 of the board side optical connector 200. In this step, the backplane-side optical connector 10A and the board side optical connector 200 are correctly positioned with respect to each other. The connecting face 28a of the housing 28 of the backplane-side optical connector 10A meets with the connecting face 208a of the housing 208 of the board side optical connector 200.

At this stage, the backplane-side optical connector 10A has not been heated yet, and the thermally driven actuator 38 has not been worked yet. Accordingly, the ferrule 21 is retracted inside the housing 28. The ferrule 90 of the board side optical connector 200 has not been deformed yet and the front part 91 still projects from the housing 208.

FIG. 7C illustrates the optically connected state. The backplane-side optical connector 10A receives heat, and the shape memory alloy spring 37 of the thermally driven actuator 38 starts elongating. The ferrule 21 is pushed by the shape memory alloy spring 37 toward the connecting face 28a of the housing 28. The elastic body 36 is compressed by the compressive force of the shape memory alloy spring 37. The front face 21a of the ferrule 21 is pressed against the front face 91a of the elastically deformable ferrule 90 of the board side optical connector 200 and it pushes the front part 91 of the ferrule 90 back inside the housing 208.

Because the rear part 92 of the ferrule 90 of the board side optical connector 200 is fixed in the housing 208, the arms 93 warp and the distance between the front part 91 and the rear part 92 becomes shorter. The optical fibers 222 move in the fiber guide holes 95 (see FIG. 6) toward the front face 91a of the ferrule 90. When one of the optical fibers 222 of the board side optical connector 200 encounters the counterpart optical fiber 22 of the backplane-side optical connector 10A, the first connected optical fiber 222 cannot advance any longer. Thus, the first connected optical fiber 222 starts bending or buckling in the internal space of the connector 200. The other optical fibers 222 still move toward the front face 91a until they encounter the counterpart optical fibers. This arrangement ensures fiber connection (optical coupling) in all the channels.

Figure 8A:
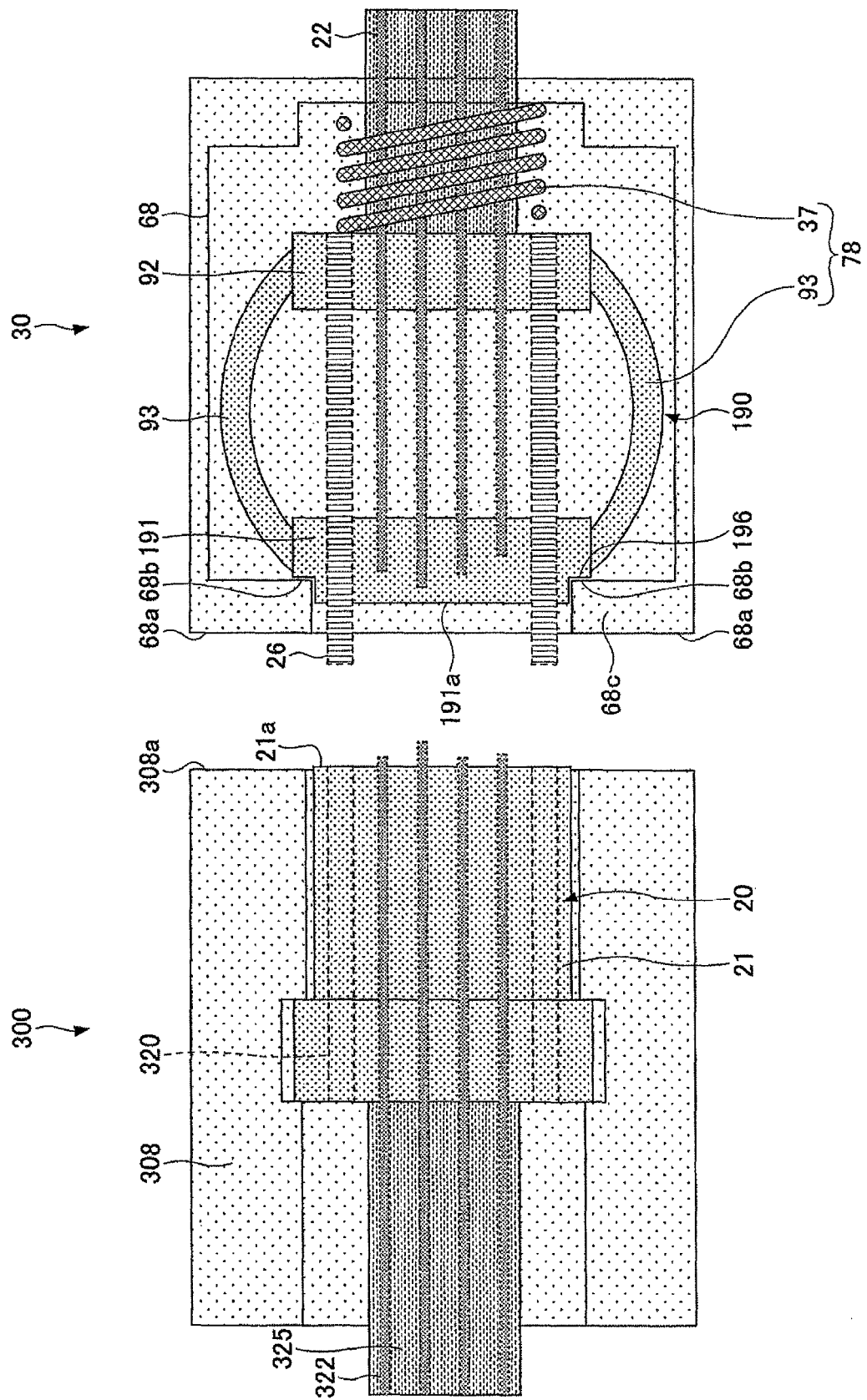
FIG. 8A is a diagram illustrating a disconnected state of an optical connector with a thermally driven actuator to which the ferrule of FIG. 6 is applied according to an embodiment.
Figure 8B:
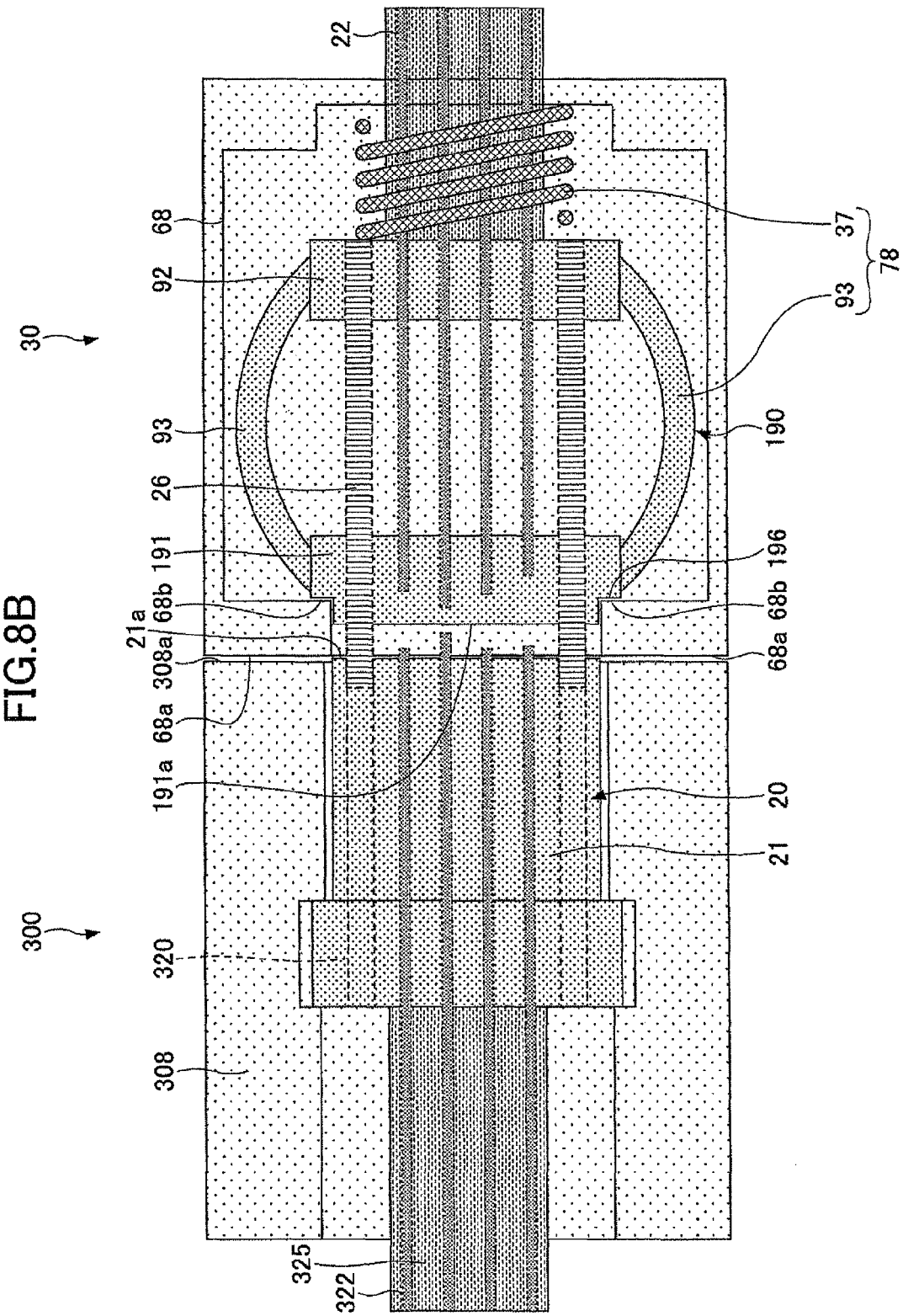
FIG. 8B is a diagram illustrating a semi-connected state of the optical connector with the thermally driven actuator to which the ferrule of FIG. 6 is applied.
Figure 8C:
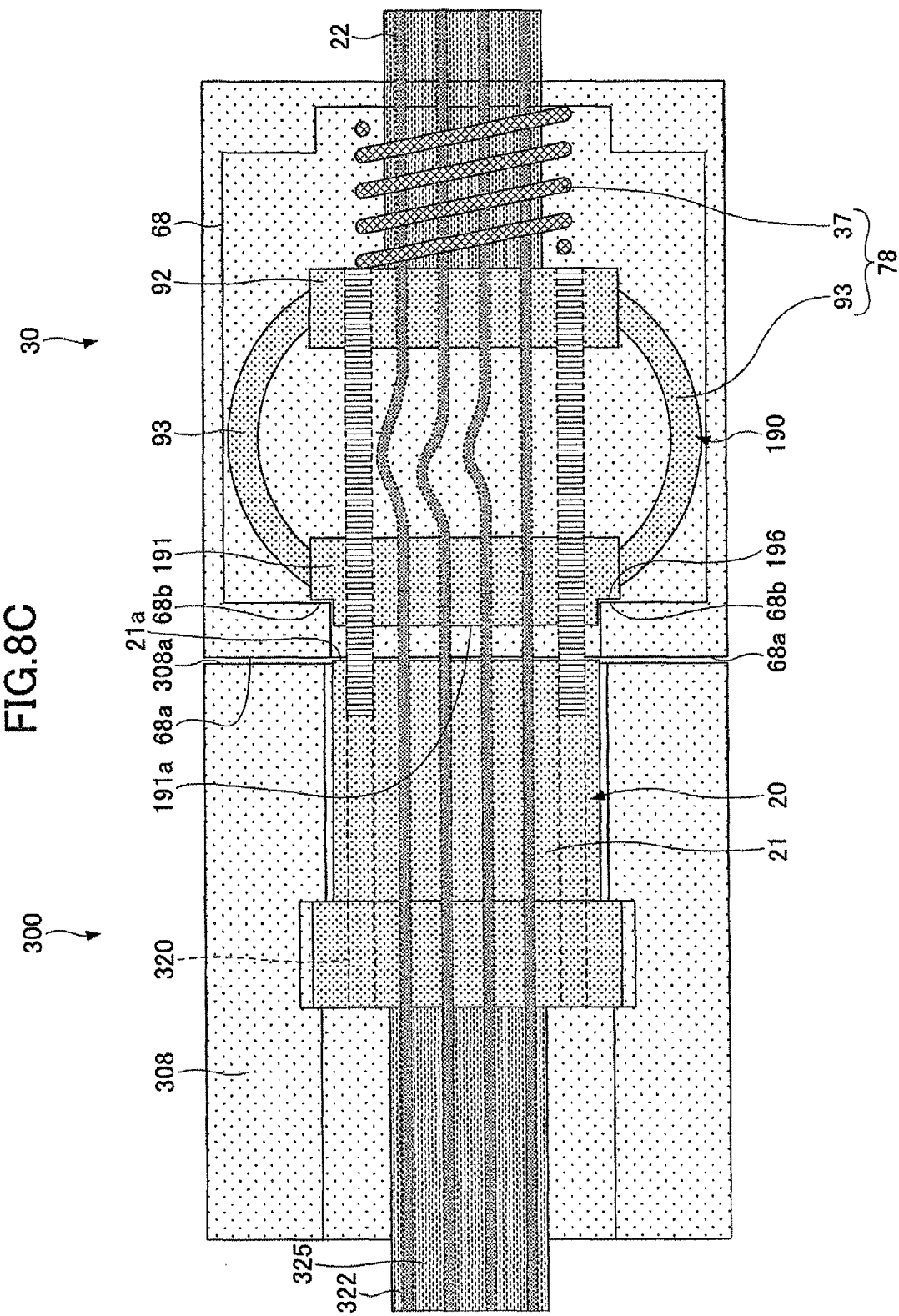
FIG. 8C is a diagram illustrating an optically connected state of the optical connector with the thermally driven actuator to which the ferrule of FIG. 6 is applied.

FIG. 8A through FIG. 8C illustrate still another example in which an elastically deformable ferrule 190 of the same type as ferrule 90 of FIG. 6 is applied to an optical connector 30 with a thermally driven actuator. FIG. 8A illustrates the disconnected state, FIG. 8B illustrates the semi-connected state, and FIG. 8C illustrated the optically connected state.

Referring to FIG. 8A, the optical connector 30 includes optical fibers 22, a ferrule 190 for holding the optical fibers 22, and a shape memory alloy spring 37 located at the rear end of the ferrule 190. The shape memory alloy spring 37 and the arms 93 of the ferrule 190 form a thermally driven actuator 78.

The optical connector 30 is provided on, for example, the backplane side. The ferrule 190 includes a front part 191, a rear part 92, and flexible arms 93 connecting the front part 191 and the rear part 92. The front part 191 has a stopper 196 which engages with the corner 68b of the front wall of the housing 68. The front part 191 of the ferrule 190 is secured by the stopper 196. The position of the front face 191a of the ferrule 190 is fixed to a position retracted from the connecting face 68a of the housing 68.

A board side connector 300 is any optical connector. In the example of FIG. 8A, the connector 300 has a typical no-polish multi-fiber ferrule 20. The optical fibers 322 coated with a tape 325 are held in a ferrule 21. The front face 21a of the ferrule 21 aligns with the connecting face 308 of the housing 308.

In FIG. 8B, the guide pins 26 of the optical connector 30 are fit into the guide-pin holes 320 of the board side connector 300, and the two optical connectors are correctly positioned with respect to each other. The connecting face 68a of the housing 68 of the optical connector 30 is in contact with the connecting face 308a of the housing 308 of the board side connector 300. Since the front face 191a of the ferrule 190 of the optical connector 30 is fixed inside the housing 308, slightly retreating from the connecting face 308a of the housing 308, a space is created between the front face 191a of the ferrule 190 and the front face 21a of the ferrule 21 of the board side connector 300. In this state, the optical fibers 22 of the optical connector 30 and the optical fibers 322 of the board side connector 300 have not been optically coupled yet (in the semi-connected state).

In FIG. 8C, when a heat is applied to the optical connector 30, the state transitions from the semi-connected state to the optically connected state in which optical fibers 22 and 322 are coupled with each other. Under the application of heat, the shape memory alloy spring 37 elongates and pushes the rear part 92 of the ferrule 190 ahead. Because the front part 191 is secured, the arms 93 warp and the optical fiber 22 move ahead inside the fiber guide holes (see FIG. 6) of the front part 191. The optical fibers 22 keep on advancing until they encounter the corresponding optical fibers 322 of the board side connector 300. Because the lengths of the optical fiber 22 vary, the first connected optical fiber 22 start bending in the internal space between the front part 191 and the rear part 92. All the optical fiber 22 can be coupled to the optical fibers 322 of the board side connector 300 under the compressive force of the spring 37.

When the application of heat ceases and the temperature falls to or below a prescribed temperature, the restoring force of the arms 93 of the ferrule 191 causes the shape memory alloy spring 37 to contract. Accordingly, the state returns to the semi-connected state of FIG. 8B. The position at which the rear part 92 of the ferrule 190 is not pressed by the spring 37 corresponds to the first position at which the ferrule 190 is retracted inside the housing 68. The position at which the rear part 92 is pressed by the spring 37 to bring the optical fibers 22 into optical connection with the counterpart optical fibers 322 of the board side connector 300 corresponds to the second position.

Using the elastically deformable ferrule 190, the optical fibers 22 are slightly bent during the use and a stress is continuously applied to the inside of the optical fibers 22. Upon releasing the heat application, the rear part 92 returns to the original position, and the buckling of the optical fibers 22 is released. Since long-term reliability is generally determined by stress, the life of the optical connector 30 is increased by avoiding unnecessary stress from being applied when not in use. In addition, vibrations generated during detaching and insertion of the board is prevented from being propagated directly to the optical fibers and the optical fibers and the ferrule can be protected from damage. It is unnecessary to provide a separate elastic body because the ferrule 191 serves as an elastic body in itself to push back the shape memory alloy spring body. The above-described configurations of the elastically deformable ferrule are applicable not only to the backplane-side connector with the thermally driven actuator or the board side connector depicted in the figures, but also applicable to arrangements in which the backplane side and the board side are reversed. The elastically deformable ferrule can also be applicable to an arbitrary interconnection of optical transmission paths, other than the connection between the backplane board and the CPU board.

FIG. 9 illustrates another modification of the thermally driven actuator of FIG. 4. The thermally driven actuator 47 of FIG. 9 includes a bilayer diaphragm 47 and the elastic body 36. The bilayer diaphragm 47 is formed with a material 47a with a large thermal expansion and a material 47b with a small thermal expansion, which materials are bonded together as illustrated in part (B) of FIG. 9. The bilayer diaphragm 47 can be made of a bimetal or a silicon bimetal. The diaphragm 47 is placed between the rear face 21b of the ferrule 21 and the inner wall of the connector housing 28. Upon application of heat, the diaphragm 47 starts bending as illustrated in part (C) of FIG. 9 as the temperature rises and pushes the rear face 21b of the ferrule 21. Consequently, the ferrule 21 moves toward the optically connected position. For the diaphragm 47, two materials with different coefficients of thermal expansion are used, or alternatively, a shape memory alloy can be used as either one of the materials of the diaphragm to achieve the same effect. Instead of the ferrule 20, the elastic deformable ferrule 190 illustrated in FIG. 8A through FIG. 8C may be used.

Figure 10:
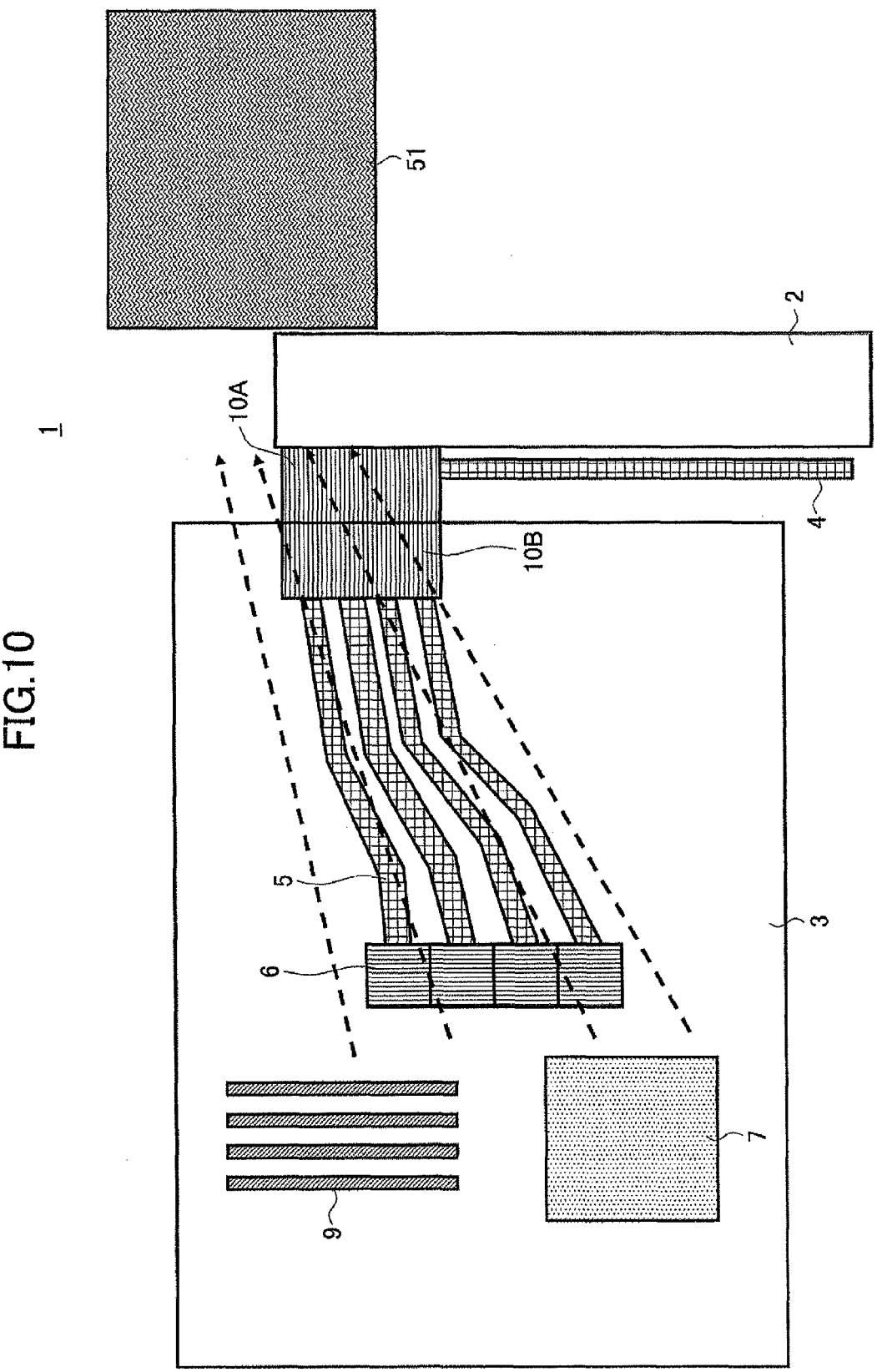
FIG. 10 is a diagram illustrating an arrangement of electronic equipment using the heat-driven optical connector of the embodiments, which makes use of waste heat as a heat source.

FIG. 10 through FIG. 13 illustrate heat supply to a thermally driven actuator. These examples make use of waste heat from electronic components mounted on the board 3. The electronic components such as an LSI 7 and a memory 9 mounted on the board 3 are heat sources. Although not illustrated in the figures, a power-feed connector is also provided on the board 3. Accordingly, a passive and automatic coupling mechanism making use of waste heat is implemented as illustrated in FIG. 10. In this case, an intake fan 51 is provided on the backplane side to exhaust the heat generated by and air-cool the electronic components 7, 9, etc., which have been powered on for start-up.

Upon insertion of the board 3 in the backplane board 2 to build a part of electronic equipment 1, the optical connectors 10A and 10B get into the semi-connected state of FIG. 5B. After completion of the start-up of the electronic components 7, 9 and etc., the waste heat from the electronic components raises the temperatures of the optical connectors 10A and 10B. Accordingly, the state transmits to the optically connected state of FIG. 5C. When the electronic equipment 1 stops operating, the supply of the waste heat is stopped and the optical connectors 10A and 10B automatically return to the semi-connected state of FIG. 5B. This can be realized if at least one of the optical connectors 10A and 10B employs the structure of the optical connector 10 with the thermally driven actuator illustrated in, for example, FIG. 4 or FIG. 9. Alternatively, one or both of the optical connectors 10A and 10B can employ the structure of the optical connector 30 illustrated in FIG. 8A through FIG. 8C.

Figure 11:
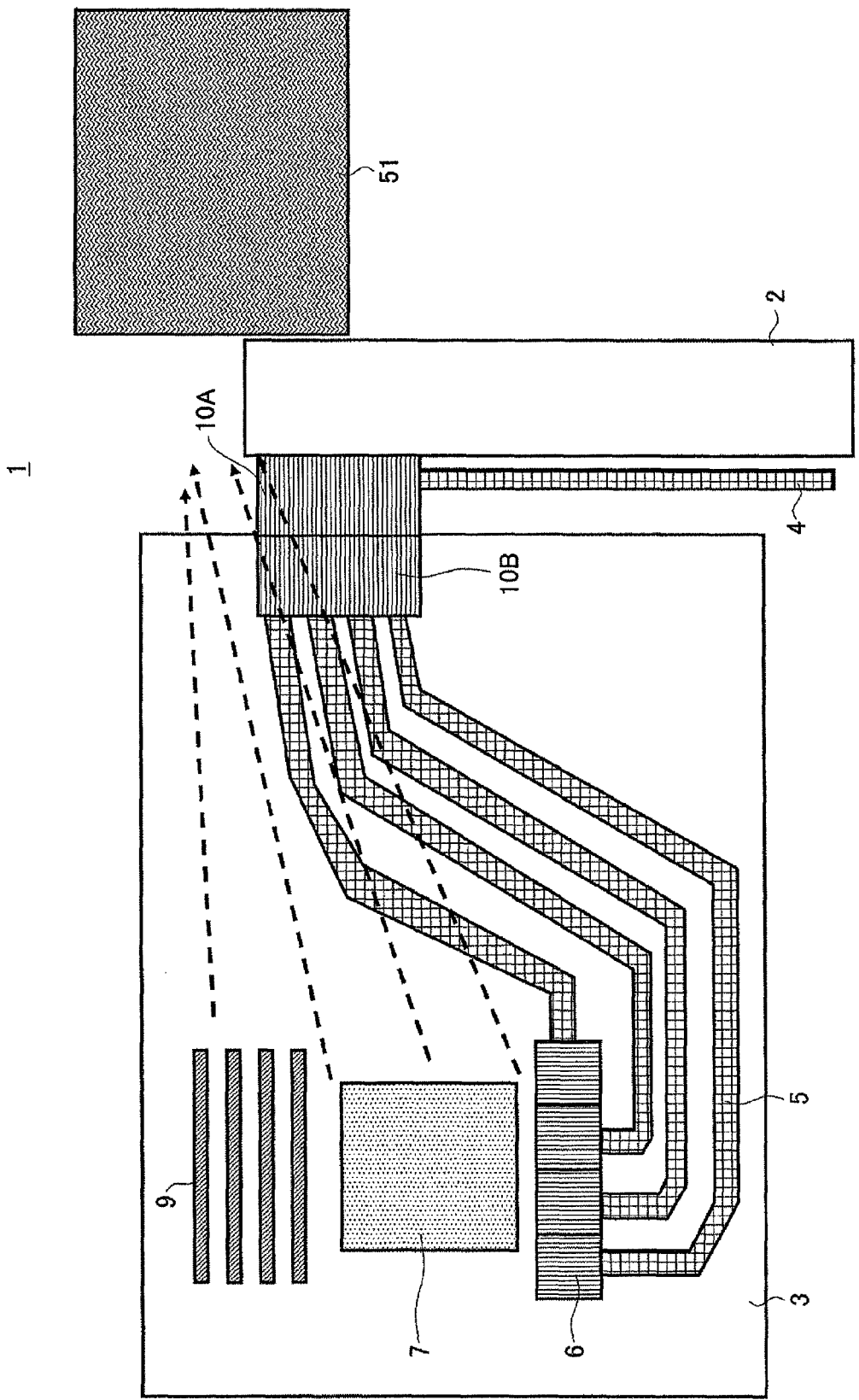
FIG. 11 is a diagram illustrating another arrangement of the electronic equipment, making use of waste heat as the heat source.

FIG. 11 is a diagram illustrating a modification for preventing adverse effects of the waste heat on the O/E and E/O conversion module 6 and the optical transmission paths (waveguides) 5. Heat fluxes generated from the LSI 7 and the memory 9 flow toward the intake fan 51 as indicated by the dashed arrows. The O/E and E/O conversion module 6 and the optical transmission paths 5 are located so as to avoid the heat passages. In this example, the lengths of the optical transmission paths 5 become somewhat longer, but it does not affect transmission of light signals. Rather, this layout can prevent variation due to the heat.

Figure 12:
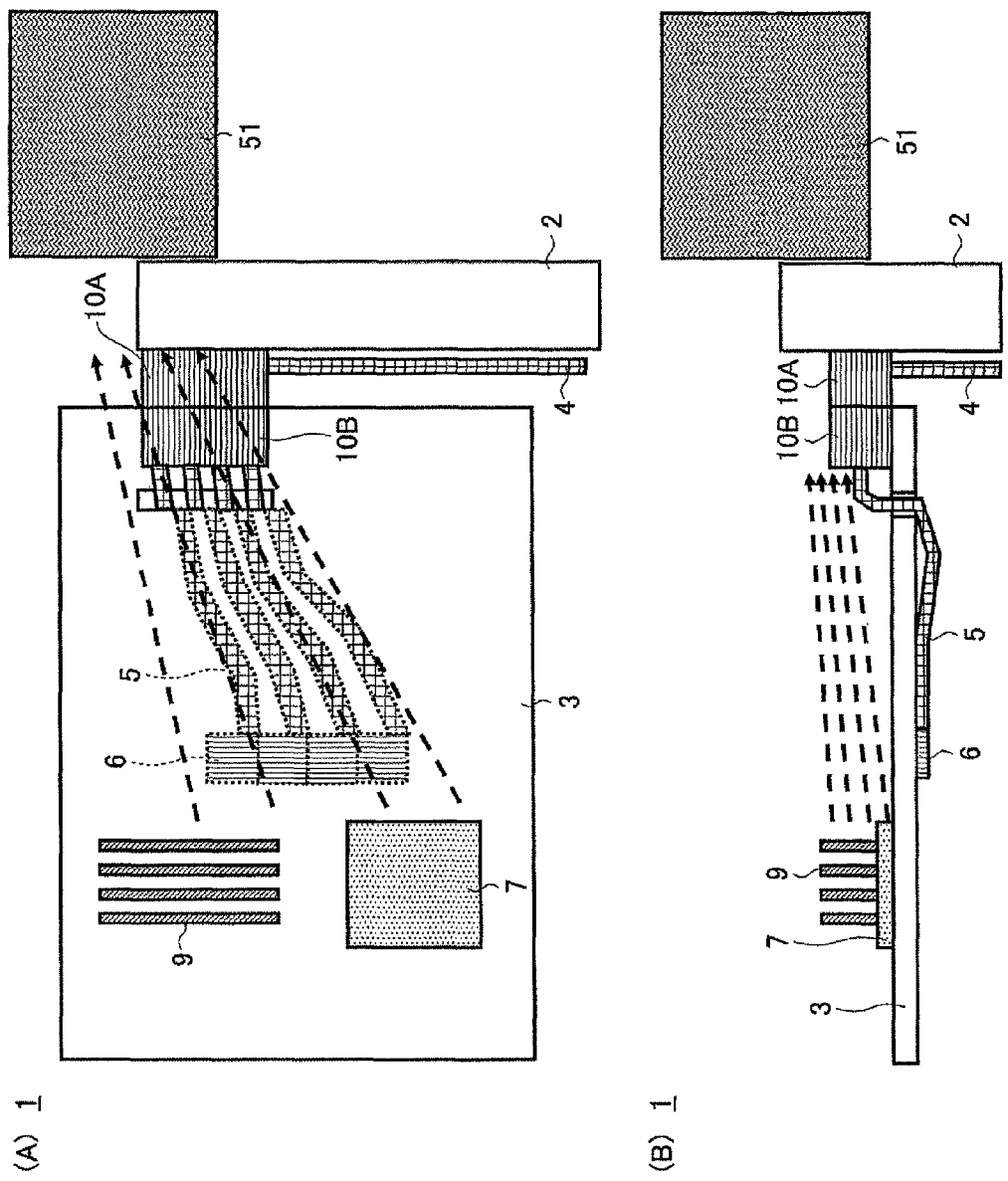
FIG. 12 is a diagram illustrating still another arrangement of the electronic equipment, making use of waste heat as the heat source.

FIG. 12 illustrates another modification for avoiding influence of the heat. In this example, the O/E and E/O conversion module 6 and the optical transmission paths 5 are provided on the rear face of the board 3, opposite to the surface on which the LSI 7, the memory 9, etc., are mounted. With this arrangement, the lengths of the optical transmission paths 5 can be shortened. When receiving the heat from the electronic components 7 and 9, the thermally driven actuator 38 (or 48) of the optical connector 10B is driven and displaces the ferrule 21 to the optically connectable position at which the optical connector 10B is optically coupled to the backplane side optical connector 10A.

Figure 13:
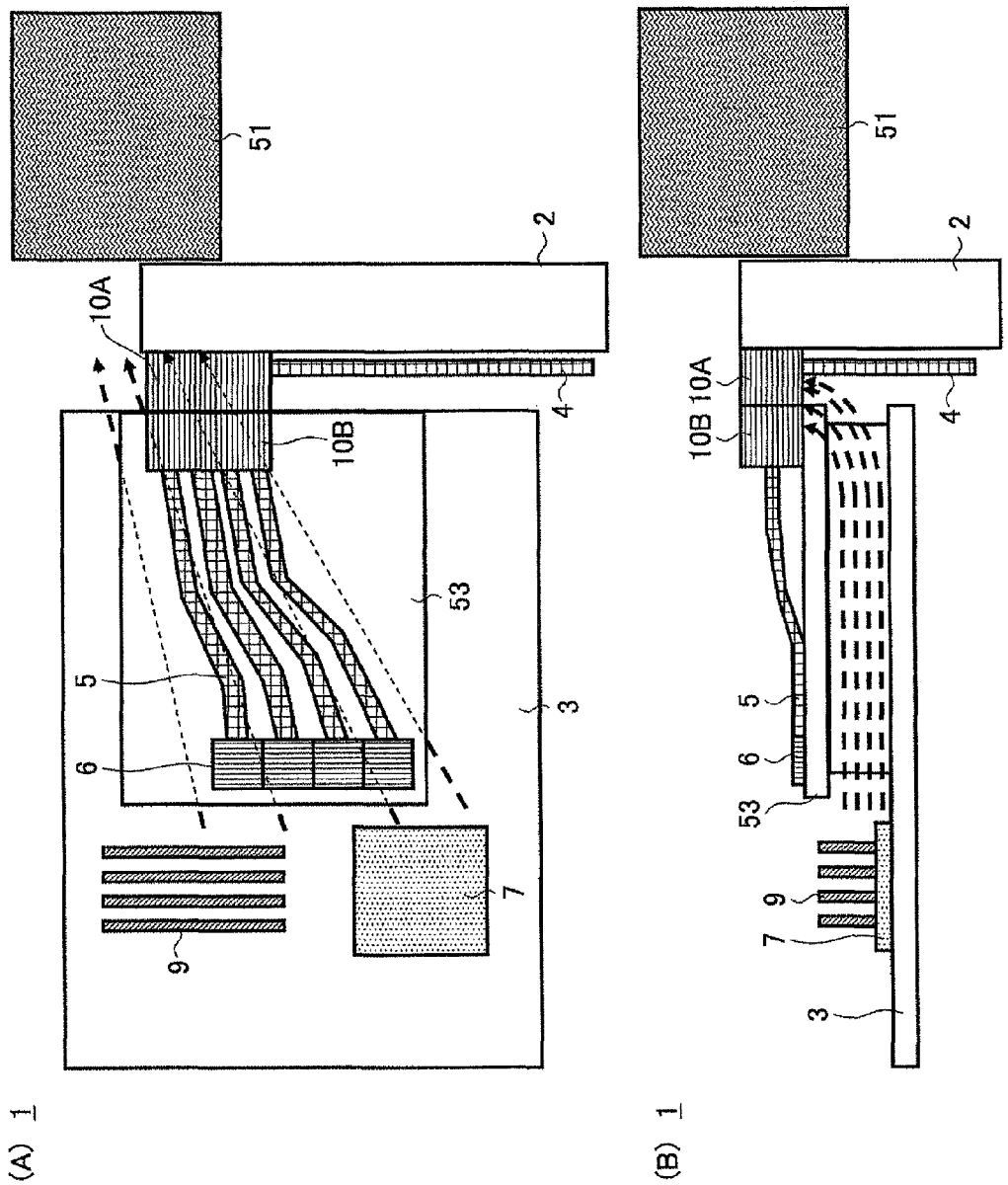
FIG. 13 is a diagram illustrating yet another arrangement of the electronic equipment, making use of waste heat as the heat source.

FIG. 13 illustrates still another modification for avoiding influence of the heat. In this example, the O/E and E/O conversion module 6 and the optical transmission paths 5 are provided on a mezzanine card 53. The mezzanine card 53 can be added easily simply by inserting it on the board 3. It is unnecessary to form through-holes on the board 3.

Figure 14:
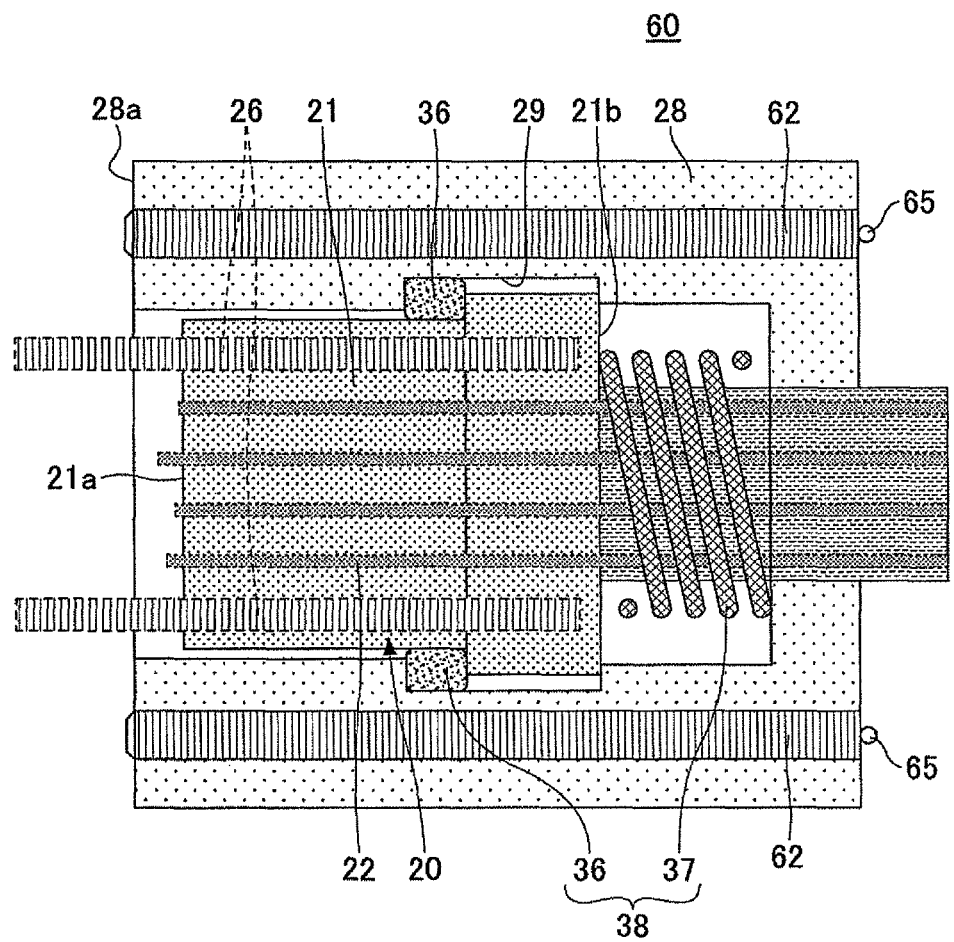
FIG. 14 is a diagram illustrating an example of an optical connector with a thermally-assisted mechanism which makes use of waste heat as the heat source.

FIG. 14 illustrates an optical connector 60 which employs a thermally-assisted mechanism. Depending on the environment in which the electronic equipment 1 is used, there might be a case where a margin toward temperature increases by the waste heat is insufficient. To ensure the optical connection, a heating element 62 is provided in the optical connector 60 as the thermally-assisted mechanism. The heating element 62 made of, for example, NiCr is provided inside of the connector housing 28 to raise the temperature of the optical connector 60 above the environmental temperature by electrical heating through a power feeder terminal 65. This arrangement allows effective deformation of the shape memory alloy spring 37 and ensures positional shift of the ferrule 21 to the optically connected position.

Figure 15:
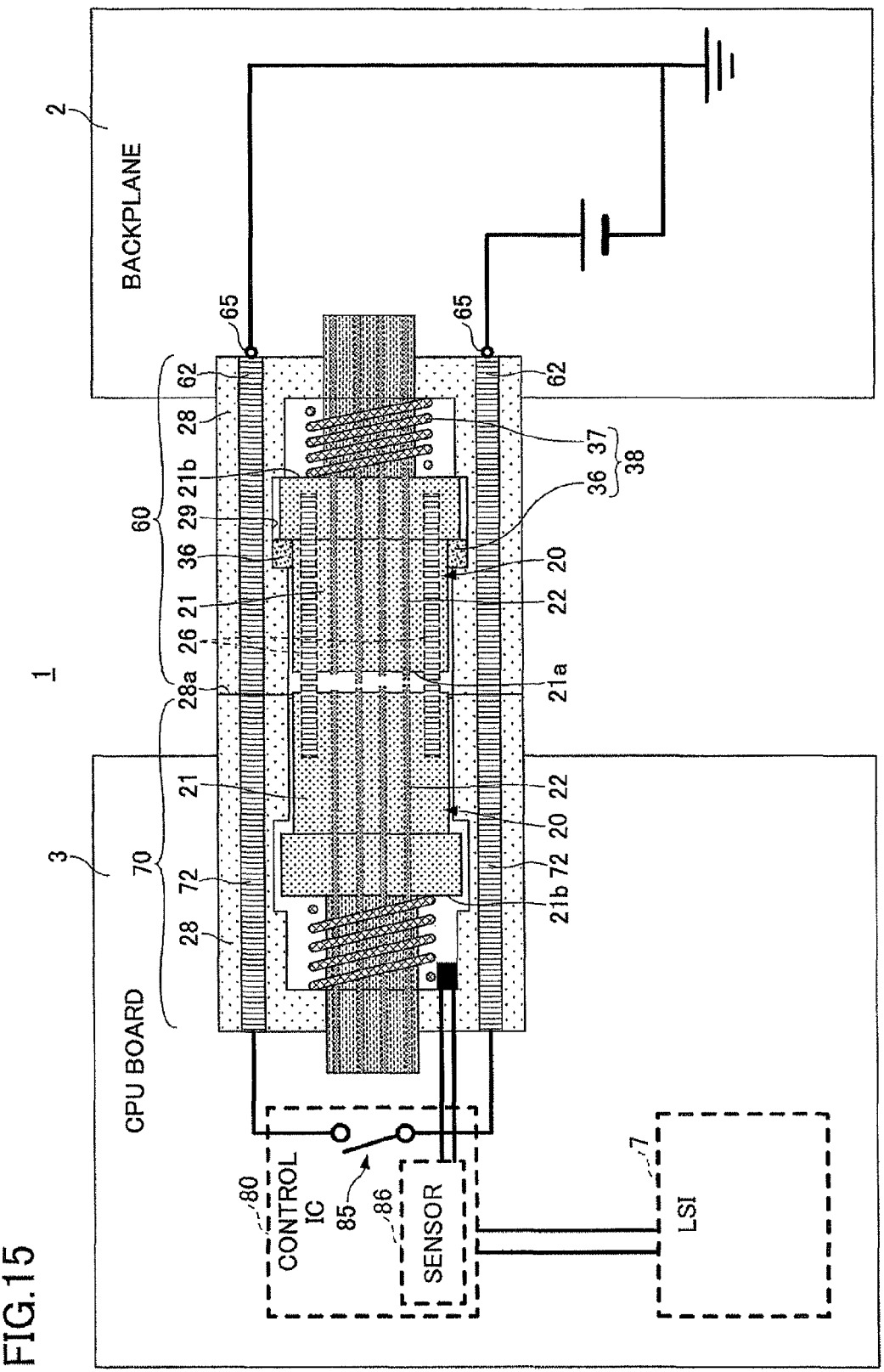
FIG. 15 is a diagram illustrating a control circuit for the thermally-assisted mechanism.

FIG. 15 is a diagram illustrating power feed control for the thermally-assisted mechanism of FIG. 14. In FIG. 15, a backplane-side optical connector 60 is connected to the board side connector 70. The backplane-side optical connector 60 has the thermally driven actuator 38 and the heating element 62. Feeding is carried out to the heating element 62 from the backplane. The board side connector 70 does not necessarily have the thermally driven actuator 38, but it has a heating element 72. The heating element 72 is connected to the heating element 62 when the board side optical connector 70 is connected to the backplane-side optical connector 60.

A control IC 80 is provided on the board 3, together with the electronic components such as the LSI 7 and so on. The control IC includes a switch 85 and a thermal sensor 86. The switch 85 is electrically connected to the heating element 72 of the board side optical connector 70. The ON/OFF operations of the switch 85 are regulated by the control IC 80.

Operations of the electronic equipment 1 are explained. First, the board 3 is inserted in the backplane board 2 (as illustrated in FIG. 1), the housing 28 of the optical connector 60 and the housing 28 of the optical connector 70 are connected to each other to make the semi-connected state (as illustrated in FIG. 5B). Feeding is made to the LSI 7 from a power supply (not illustrated in the figure) to start up the LSI 7. The LSI 7 starts communicating with the control IC 80. The LSI 7 turned on the switch (heater switch) 85 of the control IC 80 and monitors outputs of the thermal sensor 86. Upon turning on the switch 85, power is fed to the heating element 62 of the backplane-side optical connector 60. With the heat generated from the heating element 62, the thermally driven actuator 38 displaces the ferrule 21 toward the optically connected position. When the optical connector 60 and the optical connector 70 are optically coupled with each other, optical communication can start. The LSI 7 monitors outputs of the thermal sensor 86 and controls the ON/OFF operations of the switch 85 so as to maintain the output level of the sensor 86 within a predetermined temperature range. With this arrangement, heat generation of the heating elements 62 and 72 is controlled to maintain the connection between the optical connectors 60 and 70 (i.e., optical coupling between the optical fibers) in the appropriate state.

In terminating the operations of the electronic equipment 1, the LSI 7 turns off the switch 85 of the control IC 80 in response to a stop command from the OS. Since power feeding is terminated, the temperature of the optical connector 60 falls. The elastic body 36 of the thermally driven actuator 38 of the optical connector 60 pushes the ferrule 21 back to the non-coupling position. The optical connector 60 and the optical connector 70 get in the semi-connected state of FIG. 5B. In this state, the board 3 is detachable from the backplane board 2.

As has been described above, a thermally driven actuator is used as a mechanism for pushing the ferrule 21 to change the connection state moderately in response to the temperature change. By combining the elastic body 36 with the shape memory alloy spring 37 or the bilayer diaphragm 38, the front face of the ferrule can be shifted between a high temperature position and a low temperature position. The semi-connected state in which a gap is created between the facing ferrules is realized although the housings of the optical connectors are mated to each other. The same effect can be achieved when using the elastically deformable ferrule 90 (FIG. 6) or 190 (FIG. 8A through FIG. 8C) in place of the ferrule 20.

The semi-connected state is achieved when the CPU board is inserted in the backplane board but the electronic equipment has not been activated. Accordingly, impact shocks generated during transportation of the equipment are not transmitted to the optical connectors. During insertion of the board, the impact due to the board insertion can also be prevented from being transmitted to the optical connectors because the optical connectors are still in the semi-connected state. When the equipment is not in use, the optical connectors are in the semi-connected state, and accordingly, long-term reliability is achieved without applying stress to the fibers. The optical connectors of the embodiments can be applied to the backplane-side connectors to construct an architecture making use of the waste heat of a server board. Under this architecture, the optical connectors can transitions from the semi-connected state to the optically connected state in the passive manner. By embedding the heating element in the optical connector, the optical connection can be actively controlled.

The descriptions made above are only exemplified illustrations of control of a thermally driven optical connector between the semi-connected state and the optically connected state. Any modifications or analogous structures can be employed to achieve transition between the semi-connected state and the optically connected state by thermal activation. All the embodiments described above can be combined with each other.

The optical connectors and electronic equipment of the embodiments are applicable to an arbitrary optical transmission system, including industrial transmission systems and public transmission systems.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical connector comprising:
a fiber holder to hold optical fibers;
a housing to accommodate the optical fibers and the fiber holder; and
a thermally driven actuator to displace at least a part of the fiber holder upon application of heat from a first position at which the fiber holder is retracted inside the housing to a second position that allows the optical fibers to be optically coupled to a counterpart connector,
wherein the thermally driven actuator includes:
a first elastic body that deforms under application of the heat and pushes the fiber holder toward the second position, and
a second elastic body that deforms when application of the heat ceases to push the fiber holder back to the first position.

2. The optical connector according to claim 1, wherein the fiber holder is elastically deformable, and a portion of the fiber holder becomes the second elastic body.

3. The optical connector according to claim 2, wherein the fiber holder has a front part, a rear part, and a flexible arm connecting the front part and the rear part.

4. The optical connector according to claim 3, wherein at least a portion of the optical fibers bend between the front part and the rear part when the fiber holder is at the second position.

5. The optical connector according to claim 1, further comprising:
a heating element provided in the housing.

6. The optical connector according to claim 5, wherein the heating element has a power feed terminal that is under power feed control linked with an operation of an electronic component to and from which a signal is transmitted and received via the optical connector.

7. The optical connector according to claim 1, wherein the first elastic body is a shape memory alloy spring or a bilayer diaphragm.

8. The optical connector according to claim 1, wherein a recess is formed in an inner wall of the housing to regulate positional shift of the fiber holder, and the second elastic body is provided in the recess and positioned between the fiber holder and the inner wall.

9. Electronic equipment, comprising:
an optical connector that has a fiber holder to hold optical fibers, a housing to accommodate the optical fibers and the fiber holder, and a thermally driven actuator to displace at least a part of the fiber holder upon application of heat from a first position at which the fiber holder is retracted inside the housing to a second position that allows the optical fibers to be optically coupled to a counterpart connector;
a board optically connected to the optical connector;
an electronic component provided on a first major surface of the board; and
an optical-to-electric and electric-to-optical converter provided on the board to carry out optical-to-electric or electric-to-optical conversion between the optical connector and the electronic component, wherein the optical connector is located on a passage of heat radiated from the electronic component, and wherein the thermally driven actuator includes a first elastic body that deforms under application of the heat and pushes the fiber holder toward the second position, and a second elastic body that deforms when application of the heat ceases to push the fiber holder back to the first position.

10. The electronic equipment according to claim 9, wherein the optical-to-electric and electric-to-optical converter and at least a part of an optical transmission path extending between the optical connector and the optical-to-electric and electric-to-optical converter are out of the passage of heat.

11. The electronic equipment according to claim 10, wherein the optical-to-electric and electric-to-optical converter and the optical transmission path are provided on a second major surface of the board opposite to the first major surface.

12. The electronic equipment according to claim 10, wherein the optical-to-electric and electric-to-optical converter and the optical transmission path are placed on a mezzanine card provided over the first major surface of the board.

13. The electronic equipment according to claim 9, further comprising:

an intake fan provided on a side of the optical connector opposite the electronic component.

14. Electronic equipment comprising:

an optical connector that has a fiber holder to hold optical fibers, a housing to accommodate the optical fibers and the fiber holder, and a thermally driven actuator to displace at least a part of the fiber holder upon application of heat from a first position at which the fiber holder is retracted inside the housing to a second position that allows the optical fibers to be optically coupled to a counterpart connector, and a heating element provided in the housing;

a board optically connected to the optical connector;

an electronic component provided on a first major surface of the board;

an optical-to-electric and electric-to-optical converter provided on the board to carry out optical-to-electric or electric-to-optical conversion between the optical connector and the electronic component, and a switch provided on the board and electrically connected to the heating element of the optical connector, wherein power feed to the heating element is controlled by on/off operation of the switch performed in conjunction with operations of the electronic component, and wherein the thermally driven actuator includes a first elastic body that deforms under application of the heat and pushes the fiber holder toward the second position, and a second elastic body that deforms when application of the heat ceases to lush the fiber holder back to the first position.

* * * * *